(12) United States Patent
Kovaleski et al.

(10) Patent No.: US 9,781,904 B1
(45) Date of Patent: Oct. 10, 2017

(54) SILICONE CHEW TOY

(71) Applicant: Funzone, Inc., Los Angeles, CA (US)

(72) Inventors: Joy Kovaleski, Los Angeles, CA (US); Ann Nelson, Thousand Oaks, CA (US)

(73) Assignee: Funzone, Inc., Los Angeles, CA (US)

( * ) Notice: Subject to any disclaimer, the term of this patent is extended or adjusted under 35 U.S.C. 154(b) by 447 days.

(21) Appl. No.: 14/258,972

(22) Filed: Apr. 22, 2014

Related U.S. Application Data

(62) Division of application No. 12/953,457, filed on Nov. 23, 2010, now Pat. No. 8,703,036.

(60) Provisional application No. 61/263,646, filed on Nov. 23, 2009.

(51) Int. Cl.
*A01K 29/00* (2006.01)
*A01K 15/02* (2006.01)

(52) U.S. Cl.
CPC .................... *A01K 15/026* (2013.01)

(58) Field of Classification Search
CPC ...................................... A01K 15/026
USPC ............... 264/77, 236, 245, 255, 331.11
See application file for complete search history.

(56) References Cited

U.S. PATENT DOCUMENTS

| | | | |
|---|---|---|---|
| 5,595,695 A * | 1/1997 | Hagen | B29C 35/18 264/177.18 |
| 5,814,260 A * | 9/1998 | Arai | B29C 67/0007 264/236 |
| 5,948,832 A * | 9/1999 | Nagamatsu | A01N 25/34 119/860 |
| 6,183,681 B1 | 2/2001 | Sullivan et al. | |
| 7,851,001 B2 * | 12/2010 | Axelrod | A23K 50/40 119/709 |
| 8,124,156 B2 | 2/2012 | Axelrod et al. | |
| 8,641,955 B2 * | 2/2014 | Gauthier | B29C 45/0062 264/247 |
| 8,703,036 B1 * | 4/2014 | Kovaleski | A01K 15/026 264/161 |
| 2001/0040312 A1 | 11/2001 | Hagen | |
| 2001/0051256 A1 | 12/2001 | Silagy et al. | |
| 2002/0048667 A1 * | 4/2002 | Kauppi | B29C 45/14688 428/209 |
| 2003/0079693 A1 | 5/2003 | Jager | |
| 2004/0083983 A1 * | 5/2004 | Markham | A01K 15/025 119/709 |
| 2005/0166865 A1 | 8/2005 | Handelsman et al. | |
| 2006/0068206 A1 | 3/2006 | Hala et al. | |
| 2007/0212456 A1 * | 9/2007 | Axelrod | A23K 50/40 426/132 |
| 2008/0191383 A1 | 8/2008 | Braeckman et al. | |
| 2009/0068923 A1 * | 3/2009 | Cheng | A63H 3/00 446/268 |

* cited by examiner

*Primary Examiner* — Kristen C Hayes
(74) *Attorney, Agent, or Firm* — Aka Chan LLP

(57) ABSTRACT

A chew toy product is made of multiple layers of silicone. Liquid silicone layers are vulcanized to a solid silicone layer to form a unitary solid silicone chew toy. Each of the layers can include a silicone colorant, so the chew toy can have multiple colors.

23 Claims, 18 Drawing Sheets

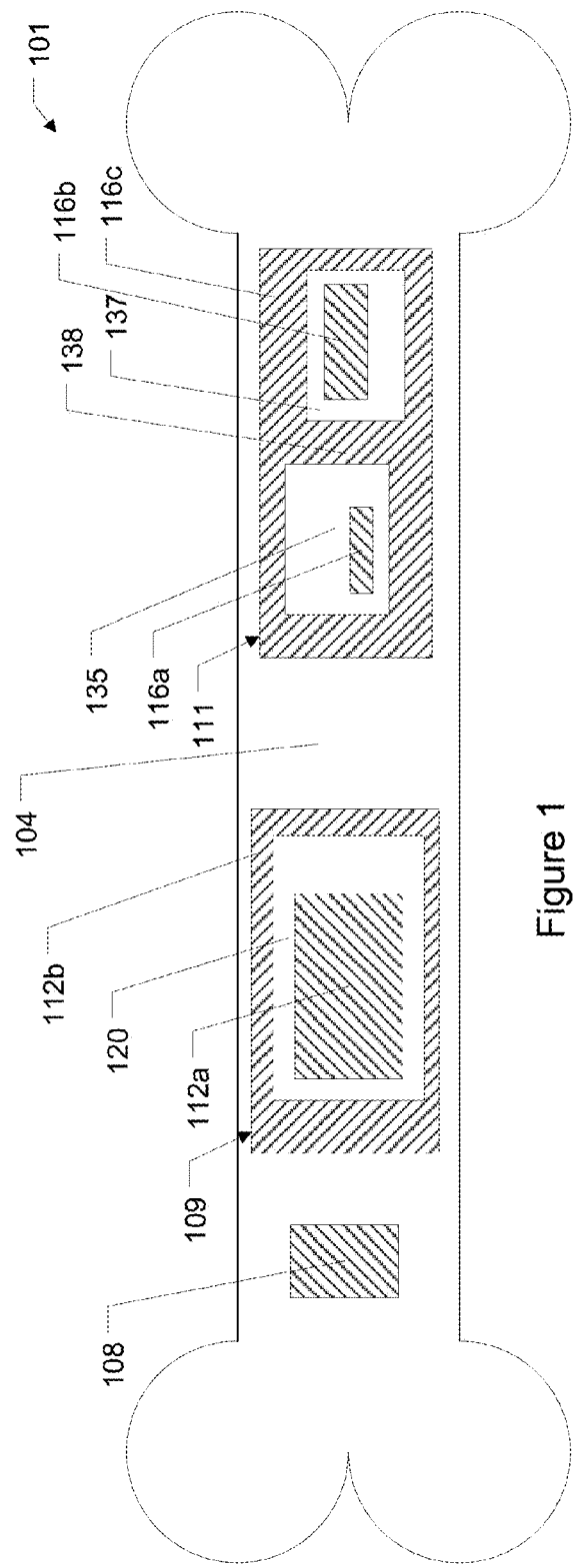
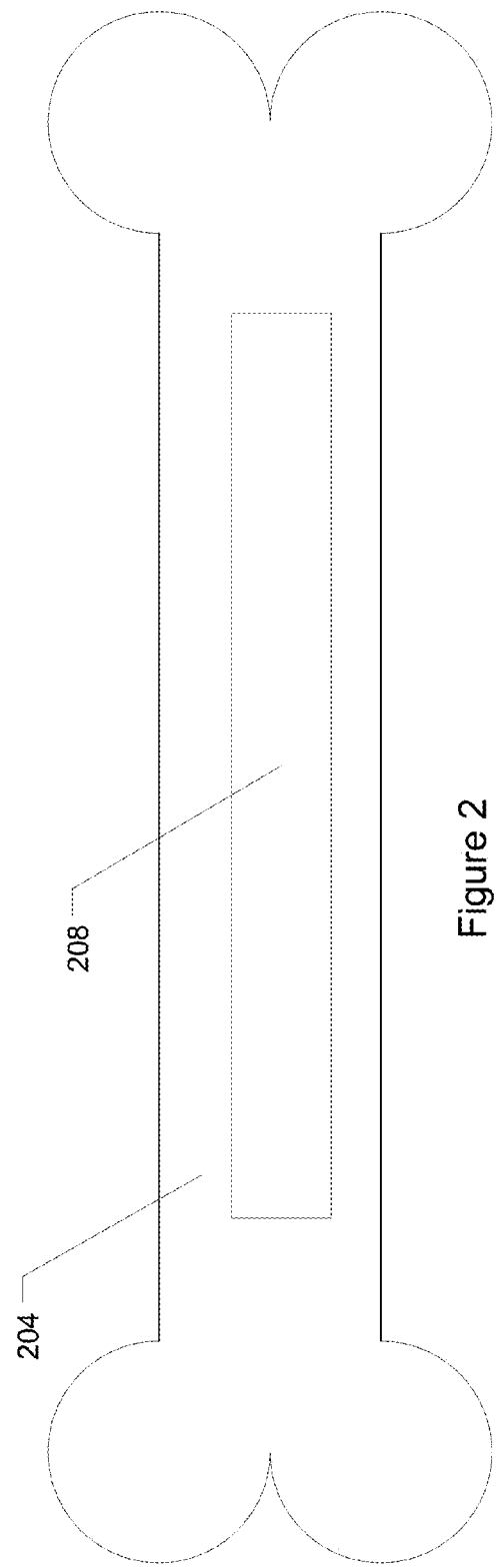
Figure 1
Figure 2

SILICONE CHEW TOY

CROSS-REFERENCE TO RELATED APPLICATIONS

This patent application is a divisional of U.S. patent application Ser. No. 12/953,457, filed Nov. 23, 2010, issued as U.S. Pat. No. 8,703,036 on Apr. 22, 2014, which claims the benefit of U.S. provisional applications 61/263,646, filed Nov. 23, 2009, which are incorporated by reference along with all other references cited in this application.

BACKGROUND OF THE INVENTION

This invention relates to a chew toy and a process of making such a chew toy, and more specifically, to a multi-layered or multicolored silicone chew toy and its manufacture.

Chew products such as chew toys are used for a variety of reasons. Animal chew products are for dogs, cats, birds, rodents, rabbits, and other pets or domesticated animals. There are infant or baby chewing toys too, such as those used by teething human infants.

Chew products provide oral care and hygiene benefits. Chewing on chew toys provide the beneficial action of the tugging and pressure on the teeth and gums that serve to toughen the gums and clean the teeth for a continuously healthy mouth. Chew toys can help prevent tartar and plaque build-up on the teeth. This helps diminish bad breath, keeps teeth whiter, and reduces the risk of potentially serious dental problems.

Chewing on chew toys also provides behavioral benefits by stimulating activity and exercising the mouth and jaw. Chew toys can prevent pets from chewing on furniture or shoes in the household or other destructive activity. For puppies and human infants, chewing on chew toys can also help relieve teething pain and stimulate the growth of adult teeth.

Further, vinyl and latex toys are potential safety hazards, easily torn apart and pieces swallowed, with potential for heavy metals in the material or decorations. Rubber toys have a potent rubber smell and taste that many dogs do not like.

Therefore, there is a need for improved chew products.

BRIEF SUMMARY OF THE INVENTION

A chew toy product is made of multiple layers of silicone. Liquid silicone layers are vulcanized to a solid silicone layer to form a unitary solid silicone chew toy. Each of the layers can include a silicone colorant, so the chew toy can have multiple colors.

Silicone chew toys can have any number of vibrant colors without the use of paint (as compared to the coloration of typical rubber and vinyl chew toys). In a chew toy, the use of paint is potentially dangerous because the paint may contain lead, mercury, or toxic substances when ingested.

A chew toy can be made according to the process as described in this patent. The chew toy will be 100 percent silicone with no paint. The chew toy has antifungal and antibacterial properties. The chew toy can be of any color and there can be additional artwork of multiple vibrant colors. The coloration of the chew toy will not stain or fade over time. The chew toy will be odorless and tasteless. The chew toy can be made of various sizes to accommodate different mouth and pet sizes, such as small- to medium-sized dogs. The silicone chew toy encourages healthy chewing.

The silicone chew toy is hygienic. The silicone chew toy can be easily cleaned, such as by immersing the toy in a pot of boiling water for a few minutes. The toy will easily withstand 100 degrees Celsius and even high temperatures without damage.

In an implementation, a silicone chew toy includes: a base layer, made from a solid silicone material of a first color, comprising a first side and a second side, a thickness of at least 16 millimeters between the first and second sides, a minimum width of at least 38 millimeters, and a minimum length is at least the same as the minimum width; and a first layer, made from a liquid silicone material of a second color, formed and vulcanized on the first side of the base layer, the first layer having a thickness of at least 0.5 millimeters, wherein the first color is different from the second color, and the silicone chew toy comprising the base and first layers can withstand at least 100 pounds of bite pressure for at least 10 seconds without breakage.

Further, the silicone chew toy of claim 1 includes: a second layer, made from a liquid silicone material of a third color, formed and vulcanized on the first side of the base layer, the first layer having a thickness of at least 0.5 millimeters, wherein a pattern of the second layer on the first side encloses a pattern of the first layer on the first side, and the third color is different from the first and second colors.

In various implementations, the first layer has a greater thickness then the second layer. The length of the base layer is at least about 135 millimeters, a maximum width of the base layer is at least about 65 millimeters, and the base layer has a first end portion joined to a middle portion, which is joined to a second end portion, the middle portion has a width of at least the minimum width and less than the maximum width, and the first end and the second ends have a width of the maximum width.

A gap, between the pattern of the first layer and the pattern of the second layer, in which the base layer is visible between the patterns of the first and second layers. The base layer is solid silicone comprising a silicone colorant of the first color and the first layer is made from liquid silicone comprising a silicone colorant of the second color.

The silicone chew toy includes: an opening in the base layer; and an interior cavity in the base layer, the interior cavity being jointed to the opening, wherein through the opening an edible substance can be stored in the interior cavity.

The opening and interior cavity extends in a line across a surface of the base layer. The silicone chew toy includes: a hole extending from the first side to the second side of the base layer; and a rope, looped through the hole in the base layer.

In an implementation, a method of making a silicone chew toy includes: combining a solid silicone material with a first colorant, wherein the first colorant is a liquid silicone material, to obtain a first combination; placing the first combination of the solid silicone and first colorant into a first cavity of a mold; layering a solid colored silicone into the mold on top of the silicone mixed with the first and second colorants; compressing the mold; and heating the mold.

The method further includes: mixing a liquid silicone material with a second colorant wherein the second colorant is a liquid silicone material, to obtain a second combination; and placing the second combination of the liquid silicone and second colorant into a second cavity of the mold.

The combining a solid silicone material with a first colorant includes: outputting the colored liquid silicone comprising the first colorant from a syringe. The first and second colorants are different hues.

In an implementation, a method of making a silicone chew toy includes: mixing liquid silicone with first silicone color paste; loading syringes with the colored liquid silicone; inserting the colored liquid silicone in cavities of a mold according to a pattern; heating to set the liquid silicone; mixing solid silicone with second silicone color paste; layering the solid silicone material into the mold on top of a decoration; vulcanizing the solid and liquid silicone together, wherein the vulcanizing comprises closing the mold; cooling the solid and liquid silicone; and trimming a silicone flashing.

Other objects, features, and advantages of the present invention will become apparent upon consideration of the following detailed description and the accompanying drawings, in which like reference designations represent like features throughout the figures.

BRIEF DESCRIPTION OF THE DRAWINGS

FIG. 1 shows a front view of a silicone chew toy.
FIG. 2 shows a back view of the silicone chew toy.

DETAILED DESCRIPTION OF THE INVENTION

Figure 3:
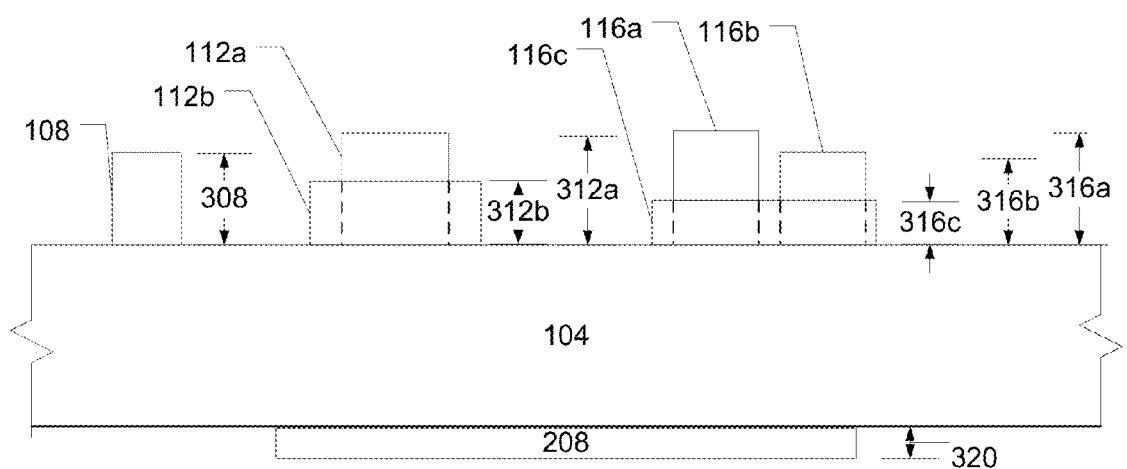
FIG. 3 shows a side view of the silicone chew toy.
Figure 4:
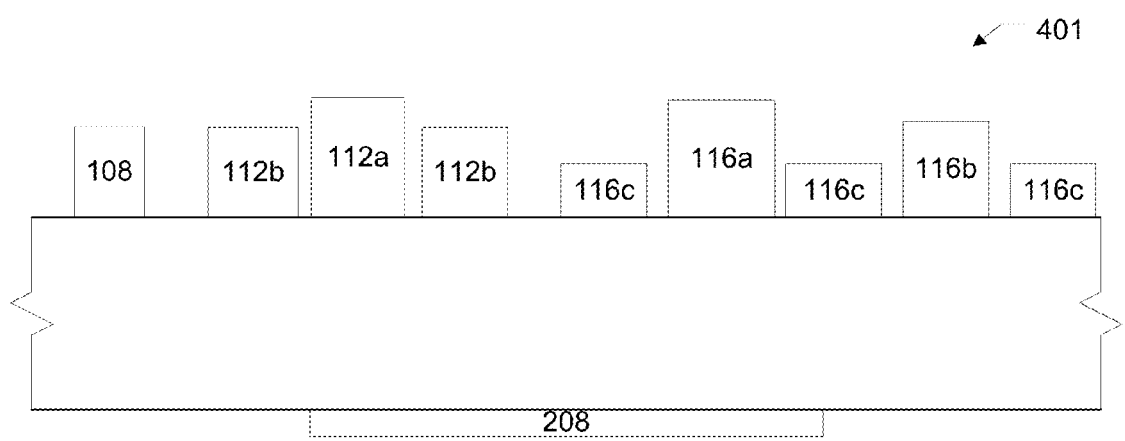
FIG. 4 shows a cross-sectional view of the silicone chew toy.

FIG. 1 shows a front view of a specific implementation of a silicone chew toy 101. FIG. 2 shows a back view of the silicone chew toy. FIG. 3 shows a side view of the silicone chew toy. FIG. 4 shows a cross-sectional view of the silicone chew toy.

FIG. 1 shows a front 104 of a base of the chew toy while FIG. 2 shows a back 204 of the chew toy. In an implementation, the base of the chew toy is made of solid silicone. In an implementation, the silicone is a food grade silicone that is safe for use with foods. The silicone base can be made of any color by using a silicone colorant in the silicone base material. The silicone is integrated with the silicone so the coloring will not fade or rub off. The silicone base can have a vibrant color (e.g., bright purple, bright red, bright yellow, or bright green) without painting the surface of the silicone. And the coloring will remain vibrant throughout the product's life.

A process of the invention facilitates the placement of artwork or other ornamentation (of different colors) on the silicone base. Artwork or other ornamentation can be applied to silicone base 104 by applying colored layers. For a solid silicone base, liquid silicone of different colors (using a silicone colorant) can be layered onto the silicone base. The front and back can have the same or different ornamentation. For example, the chew toy as shown in FIGS. 1 and 2 has different artwork on the front and back sides. For example, the front may have an intricate multicolored scatter pattern on the front side, and a message in text on the back side.

Further, there can be a different number of colors or layers on the front side as compared to the back side. For example, the front side may have two or more different colors (both different from the base) while the back side may have only one color (different from the base). In another example, the front side has two or more different colors (both different from the base) and the back side has two or more different colors (both different from the base). Both front and back sides can be multicolored, but the surface ornamentation or shapes on the two sides can be different. For example, the front may have multilayered or multicolored circles while the back has multilayered or multicolored squares.

In FIG. 1, the ornamentation on the front side of base 104 has three types of ornamentation objects, a first object 108, a second object 109, and a third object 111. These objects are formed on the surface of base 104. The base can include one or more of the object types shown and described in this application in any combination. For example, the base can have multiple first objects 108. The base can have a first object 108 and multiple second objects 109. The base can have only third objects 108 and no first and second objects 108 and 109.

The process of the invention facilitates object types being positioned anywhere as desired on the base, back or front, left or right, top or bottom, or above or below. For example, the first object can be to the right of the third object. The second object can be above the first object.

First object 108 has a single layer of one color, which can be formed by using liquid silicone having a single silicone colorant. The color of the first object can be the same color as the base. A single layer can be used to create a raised texture or other surface patterning (see discussion below for FIG. 4) for the chew toy. For example, numerous dots or other features can be formed on the surface as interesting textures for the tongue to feel or to aid with tongue cleaning.

Alternatively, the color of the single layer can be different from the base or may have a different hue or shade from the base. This can be useful for making the first object become more visible with respect to the base background color. Object 108 is shown as a rectangle but can be any artwork including any shape (e.g., polygons (open or closed), circles, squares, triangles, trapezoids, or octagons), lettering, text, graphics, or pictures (e.g., a house, tree, or roller skate).

Chew toy 101 includes a second object 109 consisting of a first feature 112a and a second feature 112b. In an implementation, these multiple layers are each made using liquid silicone having a single silicone colorant, and can be the same or a different color relative to each other, or have a different hue or shade relative to each other. For example, in an implementation, first feature 112a is light green, second feature 112b is dark green, and the base is bright blue. In another implementation, first and second features 112a-112b are light yellow and the base is purple.

Second feature 112b has an inner outline or cutout, and first feature 112a is positioned within the cutout. In an implementation, the inner outline or cutout in the second feature is a similar shape as the outer outline of the first feature. In this implementation, first feature 112a has a rectangular-shaped outline, and second feature 112b has a rectangular-shaped cutout. First feature 112a is located within the rectangular-shaped cutout of the second feature such that the cutout borders or frames first feature 112a. Between the outline of first feature 112a and the inner outline of the cutout of second feature 112b is a space 120 in which the base surface is visible. When the base surface is visible, this creates a more colorful display on the chew toy.

In another implementation, an inner outline or cutout of second feature 112b borders a perimeter of first feature 112a such that the base is not visible between the cutout and first feature 112a.

Third object 111 has two single layer features 116a and 116b, which are similar to what was described above for object 108. Features 116a and 116b can be the same color or different colors or hues from each other. A feature 116c surrounds features 116a and 116b. There is a spacing 135 and 137 between feature 116c and features 116a and 116b. Note that feature 116c has a portion 138 that divides or is in between features 116a and 116b. This can be useful for ornamentation where features 116a and 116b are the same color, while feature 116c (including portion 138) are a different color.

Feature 116c is shown to have two openings 135 and 137 to accommodate features 116a and 116b. However, in other implementations, feature 116c can have more than two openings, such as 3, 4, 5, 6, 7, 8, 9, or 10 or more. Further, within each opening, there can be multiple features or multiple layers (e.g., more than 1 layer such as 2, 3, 4, 5, or more layers).

In FIG. 1, third feature 116c has two rectangular-shaped openings or cutouts within it. First feature 116a has a rectangular-shaped outline and is positioned within a first rectangular-shaped opening of third feature 116c. Second feature 116b has a rectangular-shaped outline and is positioned within a second rectangular-shaped opening of third feature 116c.

However, although features 116a, 116b, and 116c are shown as rectangularly shaped items, it should be understood that these features can be of any shape as desired and as described above with respect to object 108.

Paste or gel treats (e.g., peanut butter or jam) can be spread over a surface of the chew toy. For example, after spreading the paste treat over the front surface of the chew toy, space 120 can be at least partially filled with peanut butter. The peanut butter may also at least partially fill spaces 135 and 137. In an implementation, the peanut butter is between first feature 112a and second feature 112b. To taste the peanut butter, a pet will gnaw at the chew toy, bite the features, or lick the surface of the chew toy. Because the peanut butter is at a hard to reach spot compared to other surfaces of the chew toy, the pet may use the chew toy for a longer period of time.

The peanut butter may also be spread over first object 108. To taste the treat, the pet will continue to gnaw at first object 108. The tactile feel of the first object will improve the pet's dental hygiene.

As was discussed, the back of the chew toy can have any number of the types of objects described with respect to the front. FIG. 2 shows a specific implementation of a back of the chew toy. This implementation has an object of a single layer 208 (similar to object 108 described above) attached to the base surface. In a specific implementation, object 208 has a single color. For example, the back side can have lettering "Chew!" in a bright yellow color on a purple-colored base. Some other examples of lettering include "fetch!," "puppy love," "best friend," "woof," "good dog," or "a woman's best friend."

FIG. 3 shows a side view of the chew toy. As explained above, each of objects 108, 109, and 111 is a layer formed on the base surface and form a raised patterning. The heights and thicknesses of the objects can vary as desired. For example, FIG. 3 shows a specific implementation with varying heights for the different layers.

Each of the features 108, 112a-112b, 116a-116c, and 208 have a height above the base surface. As shown in the figure, feature 108 has a height 308, feature 112a has a height 312a, feature 112b has a height 312b, feature 116a has a height 316a, feature 116b has a height 316b, feature 116c has a height 316c, and feature 208 has a height 320 above the base surface. Height 308 of feature 108 is greater than height 312b of feature 112b, and height 312b of feature 112b is greater than height 316c of feature 116c. Further, height 312a of feature 112a is approximately the same as height 316a of feature 116a, and heights 312a and 316a are greater than height 316b of feature 112b. The heights of the features above the base surface may be the same or different relative to each other. Further, a height of the features can vary depending on the features or the toy. In a specific implementation, the heights range from 0 millimeters to about 8 millimeters. For example, the height of the feature or layer above the base may be about 0.5 millimeters, 0.75 millimeters, 0-1 millimeters, 1 millimeter, 1.2 millimeters, 1-2 millimeters, 2 millimeters, 3 millimeters, 2-3 millimeters, 4 millimeters, 5 millimeters, 6 millimeters, or 8 millimeters. In other implementations, the feature may be greater than 8 millimeters, such as 8.1, 8.5, or over 9 millimeters.

The different heights give a texture patterning on the top, and give the chew toy a pleasant tactile feel. When a pet mouths the chew toy, the pet will have a firm grip on the silicone chew toy. Also the user can grab the toy, and it will less likely to slip, even when wet (e.g., saliva from the pet). Further, the heights also give a three-dimensional effect to the chew toy, which makes the toy more interesting.

FIG. 4 shows a cross-sectional view of silicone chew toy 101. As shown, each of the objects is formed directly on the silicone base. This patent describes forming objects directly on the base. The principles of the invention also include forming objects on previously deposited or formed objects. For example, after a first pattern if formed on the base, additional layers and patterns can be formed on the first pattern, rather than the silicone base itself. Multiple layers of liquid silicone can be formed onto one another to give, for example, multicolor layered objects.

The process of the invention permits forming of objects in relative close proximity to each other. A distance between features can vary depending on the desired design of the chew toy. In an implementation, a distance between feature 112a and feature 112b is approximately 3 millimeters. In another implementation, a distance between feature 112a and feature 112b is between approximately 0.05 millimeters and 3.5 millimeters.

Figure 5:
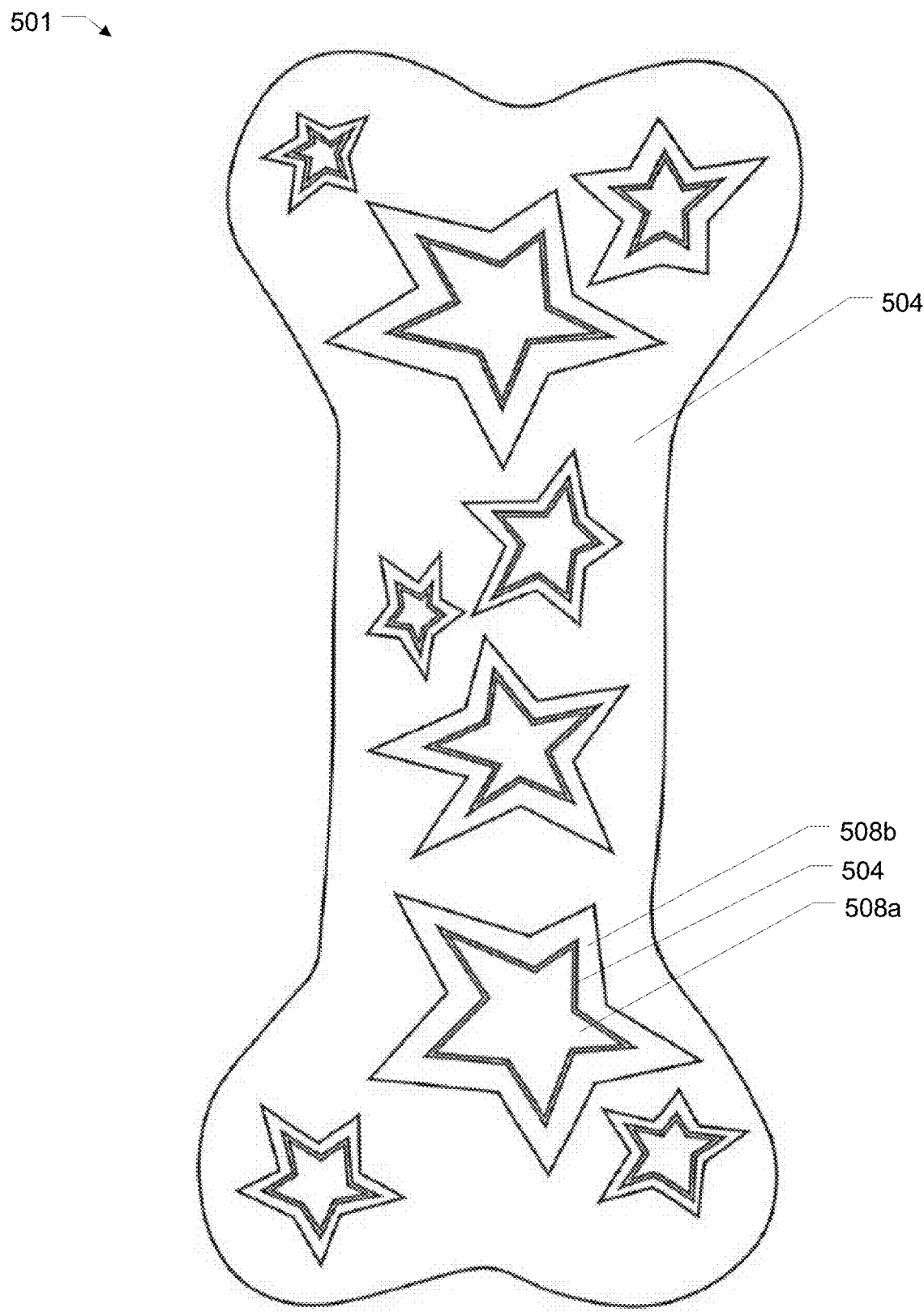
FIG. 5 shows a specific implementation of a multilayered silicone chew toy.

As discussed above, ornamentation can take any artwork form. As an example, FIG. 5 shows a specific implementation of a multilayered silicone chew toy 501 having a base surface 504 and star shapes on the base surface. In this specific implementation, the base surface has a first layer feature 508a and second layer feature 508b. The first feature is star-shaped, and the second feature is star-shaped and has a star-shaped cutout within it. The first feature is positioned within the star-shaped opening of the second feature such that a portion of the base surface is visible.

In an implementation, second layer feature 508b is 1 millimeter in height and first layer feature 508a is between 1 and 2 millimeters in height. In this implementation, a height of first layer feature 508a is equal to or greater than a height of second layer feature 508b. In an implementation, a height of a feature is not greater than 3 millimeters.

In an implementation, a distance from an outer edge of feature 508a and an inner edge of feature 508b is approximately 3 millimeters.

In an implementation, a dimension limitation for each level of the ornamentations may vary. For example, in a specific implementation having 3 levels of features, each level is no greater than 3 millimeters thick. In another implementation, each level is between 0.5 to 3 millimeters thick.

A degree of curvature on the surface decoration can vary. In an implementation, a degree of curvature limitation is approximately 35 degrees. The degree of curvature can be less than or greater than 35 degrees. For example, in another implementation, a degree of curvature is between 25 to 35 degrees. In another implementation, a degree of curvature is between 35 to 45 degrees.

The chew toy is formed with dimensions such that the chew toy will not be a choking hazard for a pet. If the chew toy is too small and can be easily swallowed or may otherwise be harmful for the pet. The length and width of the chew toy can vary. For example, in an implementation for a dog, the chew toy has a length of about 13.5 centimeters and a width of about 6.5 centimeters near an edge of the chew toy and a width of about 3.5 centimeters near a center of the chew toy.

In an implementation, the chew toy is thick enough to withstand pressure from the pet's bite such that the chew toy is not punctured or broken when gnawed or bitten. For example, when a dog bites the chew toy, the dog does not bite through the chew toy. The chew toy is durable and lasts longer. The thickness of the chew toy can vary. For example, in an implementation, a thickness of the silicone base chew toy is at least 1.25 centimeters. In another implementation, the thickness of the silicone base chew toy is at least 0.8 centimeters. The ornamentation and designs are built on top of the silicone base.

A specific implementation of a chew toy having characteristics and dimensions as described in FIG. 1 and FIG. 5 passes laboratory testing that simulate use and abuse by children. Specification of the laboratory testing and methods are describes in 16 U.S.C. 1500.53, which is incorporated by reference.

Specifically, the chew toy has at least satisfactory colorfastness properties in a colorfastness test. The colorfastness test is American Association of Textile Chemists and Colorists (AATCC) test method 107-2009, which is incorporated by reference. This test method is designed to measure the resistance to water of dyed, printed, or otherwise colored textile yarns and fabrics. Distilled water or deionized water is used in this test method because natural (tap) water is variable in composition. The specimen, backed by multifiber test fabric, is immersed in water under specified conditions of temperature and time, and then placed between glass or plastic plates under specified conditions of pressure, temperature and time. The change in color of the specimen and the staining of the attached multifiber test fabric are observed.

In particular, the chew toy can be put into the dishwasher for cleaning without fear of destroying the ornamentation or color of the chew toy. For example, in an implementation, the chew toy is put into a dishwasher for at least 5 cycles and no visual change will occur in the chew toy.

Dry and Wet Crocking Test. The chew toy also has at least satisfactory colorfastness properties in a dry and wet crocking test. Crocking is a transfer of colorant from a surface of a chew toy to another surface or to an adjacent area of the same surface. For a color (e.g., pattern) and a body (e.g., blue body), a result of a wet and dry crocking test evaluation has at least a minimum of 4.0 dry and 3.0 wet. A result of a wet and dry crocking test evaluation has a 4.5 dry and 4.5 wet result of a wet and dry crocking test evaluation. In another implementation, a dry and wet result may be different and may vary.

Colorfastness to Saliva Test. The chew toy has at least satisfactory colorfastness properties in a Saliva test. Specifically, the chew toy of FIGS. 1 and 5 has negligible or no staining from saliva. German Preliminary Standard, DIN V 53160-1:2002-10 Determination of colorfastness of articles in common use—Part 1: Resistance to artificial saliva is incorporated by reference. DIN EN 20105-A03, Textiles—colorfastness tests—Part A03: Gray scale for the evaluation of bleeding is also incorporated by reference.

Bite Test. The chew toy of FIGS. 1 and 5 can withstand a bite test, which simulates a pet or person biting the chew toy. Specifically, the chew toy has no breakage after experiencing 100 pounds of compression for 10 seconds. Further, the chew toy has no breakage after experiencing 400 pounds of compression for 10 seconds.

The bite test conditions are: Bite test for a toy (or component) that is a mouth toy shall be subject to this test. Test equipment: Contact mechanism: The contact mechanism shall be two metal strips or plates each measuring 0.25 inch 0.002 inch (0.635 centimeter) high and each having a contact edge radius of 0.020 inch 0.002 inch (0.5 centimeter) for at least a 150-degree cross-sectional arc. Loading device: The loading device shall be a scale or force gauge having an accuracy of 0.5 pound (225 grams). Testing procedure: The test article shall be placed in the contact mechanism in any reasonable position for a penetration of 0.25 to 0.5 inch (0.64 to 1.27 centimeters), which position utilizes less than 180 degrees of the arc of the contract mechanism, and a test load increasing to 100 pounds 0.5 pound (45.50 kilograms) shall be evenly applied within 5 seconds. This load shall be maintained for an additional 10 seconds.

Torque Test. The chew toy of FIGS. 1 and 5 can also be the subject of a torque test. In an implementation, the chew toy has no breakage after experiencing 4 inch-pound for 10 seconds.

The torque test conditions are: A toy with a projection, part, or assembly that a child can grasp with at least the thumb and forefinger or the teeth shall be subject to this test. Toys with rotating components. Projections, parts, or assemblies that are rigidly mounted on an accessible rod or shaft designed to rotate along with the projections, parts, or assemblies shall be tested with the rod or shaft clamped to prevent rotation. Test equipment: Loading device: The loading device shall be a torque gauge, torque wrench, or other appropriate device having an accuracy of 0.2 inch-pound (0.23 kilogram-centimeter). Clamp: The clamp shall be capable of holding the test component firmly and transmitting a torsional force. Testing procedure. With the toy rigidly fastened in any reasonable test position, the clamp is fastened to the test object or component. A torque of 4 inch-pounds 0.2 inch-pound (4.60 kilogram-centimeters) shall be applied evenly within a period of 5 seconds in a clockwise direction until a rotation of 180 degrees from the original position has been attained or 4 inch-pounds 0.2 inch-pound (4.60 kilogram-centimeters) exceeded. The torque or maximum rotation shall be maintained for an additional 10 seconds. The torque shall then be removed and the test component permitted to return to a relaxed condition. This procedure shall then be repeated in a counter-clockwise direction.

Tension Test. The chew toy can also be the subject of a tension test. In an implementation, the chew toy has no breakage after experiencing 21 pounds for 10 seconds (e.g., after a tension test).

The tension test conditions are: Any projection of a toy that the child can grasp with at least the thumb and forefinger or the teeth shall be subject to this test. This test is to be conducted on the same toy that has been subjected to the torque test described in 16 U.S.C. 1500.53, paragraph (e). Stuffed toys and beanbags. A stuffed toy or beanbag constructed of pliable materials having seams (such as fabrics) shall have the seams subjected to 15 pounds 0.5 pound (6.80 kilograms) of force applied in any direction. Test equipment: Clamps: One clamp capable of applying a tension load to the test component is required. A second clamp suitable for applying a tension load perpendicularly to the major axis of the test component is also required. Loading device: The loading device is to be a self-indicating gauge or other appropriate means having an accuracy of 0.5 pound (225 grams). Testing procedure. With the test sample fastened in a convenient position, and appropriate clamp shall be attached to the test object or component. A 15-pound 0.5 pound (6.80-kilogram) direct force shall be evenly applied, within a period of 5 seconds, parallel to the major axis of the test component and maintained for an additional 10 seconds. The tension clamp shall then be removed and a second clamp appropriate for pulling at 90 degrees shall be attached to the test object or component. A 15-pound 0.5 pound (6.80-kilogram) tensile force shall be evenly applied, within a period of 5 seconds, perpendicularly to the major axis of the test component and maintained for an additional 10 seconds.

Other objects may have lead in paint or similar surface coating materials. Children's products may contain lead that is harmful. The chew toy passes a lead test (e.g., lead in accessible substrate materials) and a phtalates test.

Lead in accessible substrate materials. The chew toy of FIGS. 1 and 5 can pass a test of the Consumer Product Safety Improvement Act, section 101, which is incorporated by reference. A method CPSC-CH-E1002-08 Standard Operation Procedure for Determining Total Lead (Pb) in Non-Metal Children Product is incorporated by reference.

The CPSIA lowers the amount of lead that can be in children's products. Section 101 sets new limits for the lead content in children's products and the amount of lead in the paint used on those products. Lead Content Limits: The limits on the amount of lead in children's products are phased in over the course of three years. By Feb. 10, 2009, products designed or intended primarily for children 12 and younger may not contain more than 600 ppm of lead. Children's products that contain more lead than 600 ppm are banned in the U.S. after Feb. 10, 2009, and the sale of those products can result in significant civil and criminal liability. The statute provides that paint, coatings or electroplating may not be considered a barrier that would make the lead content of a product inaccessible to a child. After 1 year from enactment, or Aug. 14, 2009, products designed or intended primarily for children 12 and younger cannot contain more than 300 ppm of lead. The limit goes down to 100 ppm after three years, or Aug. 14, 2011, unless the Commission determines that it is not technologically feasible to have this lower limit.

Some children's products may be exempted or excused from these new lead limits if a component part containing lead is inaccessible. The Commission will provide guidance by rule on what component parts are inaccessible within a year. The Commission will also evaluate whether certain electronic devices, including devices that contain batteries, must comply with the lead limit.

Lead in Paint Limit: In addition, after 1 year or Aug. 14, 2009, the Act provides that paint and similar surface-coating materials for consumer use must be reduced from 600 ppm to 90 ppm.

Phthalates. The chew toy of FIGS. 1 and 5 can pass a test of the Consumer Product Safety Improvement Act, section 108, which is incorporated by reference. A method ASTM D3421-75 is incorporated by reference.

The phthalates prohibition applies to three phthalates, DEHP, DBP, and BBP, which have been permanently prohibited by Congress in concentration of more than 0.1 percent in "children's toys" or "child care articles." A "children's toy" means a product intended for a child 12 years of age or younger for use when playing, and a "child care article" means a product that a child 3 and younger would use for sleeping, feeding, sucking or teething. Three additional phthalates, DINP, DIDP, and DnOP, have been prohibited pending further study and review by a group of outside experts and the Commission. This interim prohibition applies to child care articles or toys that can be placed in a child's mouth or brought to the mouth and kept in the mouth so that it can be sucked or chewed that contains a concentration of more than 0.1% of the above phthalates.

The prohibition on phthalates applies to all parts of a children's toy or child care article as defined in section 108 of the CPSIA. Section 108 does not make an exception or exemption for accessibility for phthalates as is the case for lead in children's products under section 101.

Section 108 limits the amount of phthalates in children's toys and certain other child care articles. A children's toy is a consumer product designed or intended by the manufacturer for a child 12 years of age or younger for use by the child when the child plays. Any determination as to whether a particular product is designed and intended for use by a child 12 years of age or younger, would be made on a case by case basis after consideration of the following factors:

A statement by the manufacturer about the intended use of the product, including a label on the product if such statement is reasonable. Whether the product is represented in its packaging, display, promotion or advertising as appropriate for use by the ages specified. Whether the product is commonly recognized by consumers as being intended for use by a child of the ages specified. The Age Determination Guidelines issued by the Commission staff in September 2002, and any successor to such guidelines. A manufacturer must apply these factors their products and then consider whether it is "for use by the child when the child plays" to determine whether a product meets the definition of a children's toy. The use of the product by the child for play is a fundamental aspect of such a determination. The Commission will be evaluating this using staff from Health Sciences, Human Factors, and Compliance, and hopes to provide additional guidance on this issue. In the interim, the Commission staff plans to use the definition of toy in the ASTM F963-07 toy standard for guidance.

In an implementation, a base of the chew toy is made from 100 percent silicone. Silicone is a soft and flexible material. For example, a dog can sink his teeth into the chew toy comfortably while the chew toy massages and stimulates his tongue and gums. The chew is made from a flexible material and can bend and recover its shape. Silicone has an elasticity in a range from about 30 to about 70 percent. Liquid silicone has an elasticity in a range from about 30 to about 50 percent. Solid silicone has a durometer in a range from 40 to 70 (e.g., Shore A Durometer). Liquid silicone has a durometer in a range from 30 to 50 (e.g., Shore A Durometer). The ASTM D2240 type A standard is incorporated by reference.

In another implementation, the base of the chew toy is part silicone (i.e., not 100 percent silicone). For example, in another implementation, portions of the chew toy are silicone while other portions, attached to the silicone portions, are made from leather, rubber, or other material. The tougher the material of the chew toy, the thinner the chew toy can be because the material of the chew toy can withstand more pressure without breaking compared to silicone.

The shape of the bone has been described as being shaped like a bone. This is not intended to limit the invention. The base can be formed or molded to have any desirable shape. The base can have other shapes such as a heart, gingerbread man, dog or other animal, disk or circle with a hole in the middle, or others. The dog toy can be designed to have seasonal interpretations such as Halloween, Thanksgiving, Christmas, Hanukkah, Tet, Valentine's Day, Fourth of July, National Dress Up Your Pet Day, Pet Dental Health Month, National Pet ID Week, Be Kind to Animals Week, National Dog Day, and others.

Figure 6:
FIG. 6 shows a specific implementation of a silicone chew toy having a base having a rectangular shape and a feature.

For example, FIG. 6 shows a specific implementation of a silicone chew toy having a base having a rectangular shape 604 and a feature 608.

Further, in FIG. 1, second feature 112*b* has a similar cutout shape as an outer outline shape of first feature 112*a*. This is not intended to limit the invention. The shapes of the outer outline and cutout can be any shape. The shapes of the outer outline and cutout can be the same, similar, or different from each other.

Figure 7:
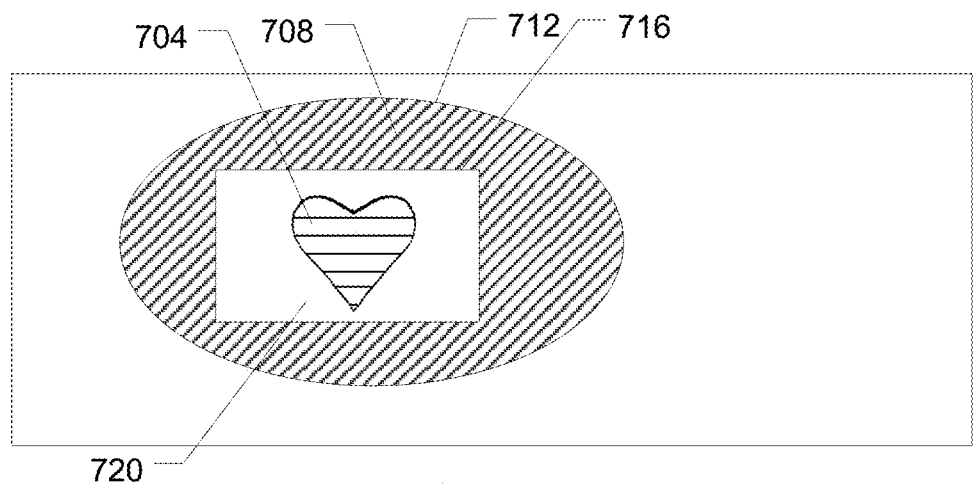
FIG. 7 shows a specific implementation of a silicone chew toy.

For example, FIG. 7 shows a specific implementation of a silicone chew toy. A first feature 704 has a heart-shaped shape and a first area. A second feature 708 has an ovular-shaped outer outline 712, a rectangular-shaped cutout 716, and a second area. Since the second feature has a cutout, an area of the second feature is less than an area of the second feature without the cutout. The first feature is positioned within the rectangular-shaped cutout. Between the rectangular-shaped cutout and the first feature is space 720, in which a base of the surface can be seen.

A specific process flow for making a chew toy of the invention is presented below, but it should be understood that the invention is not limited to the specific flows and steps presented. A flow of the invention may have additional steps (not necessarily described in this application), different steps which replace some of the steps presented, fewer steps or a subset of the steps presented, or steps in a different order than presented, or any combination of these. Further, the steps in other implementations of the invention may not be exactly the same as the steps presented and may be modified or altered as appropriate for a particular application.

Figure 8:
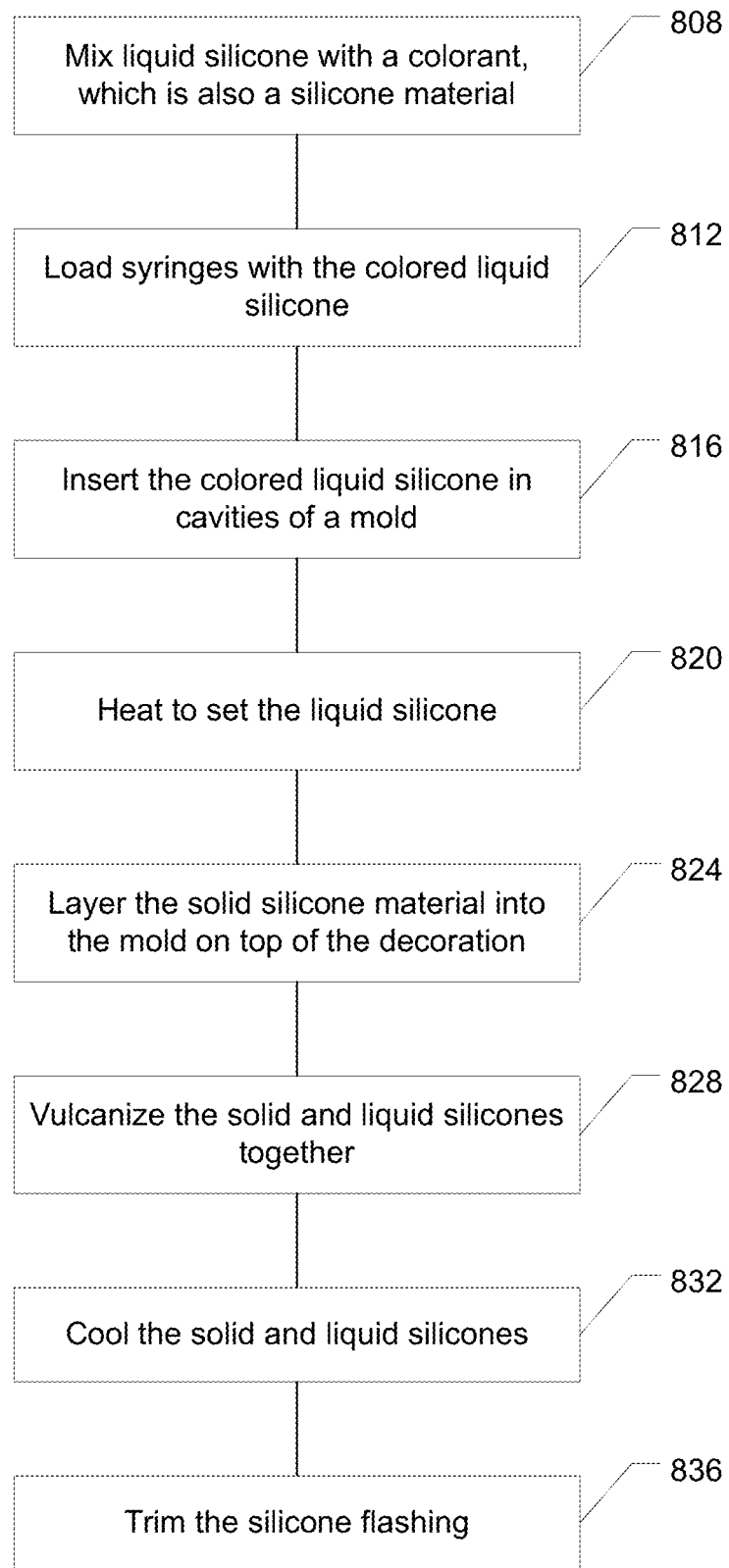
FIG. 8 shows specific steps for making a chew toy.

FIG. 8 shows a flow for making a silicone chew toy:

1. Liquid silicone is mixed with a colorant, which is also a silicone material (step 808). The silicone colorant will color the liquid to any desirable color. As described above, there may be multiple colors of liquid silicone used in a single dog chew item. The liquid silicone can be the same or differently colored (or different shade) from the base silicone material. Liquid silicone typically melts at about 160 degrees Celsius (or a temperature above this), which is lower than the melting point of solid silicone.

2. Syringes are loaded with the colored liquid silicone (step 812). There can be multiple colors or hues of colored liquid silicone, each in a separate syringe. For example, if a three-color chew toy is desired, there would be two syringes with two different colors of silicone. These would be differently colored from the base silicone. Depending on the intricacy of the patterning, there can be 3, 4, 5, 6, or 7 or more syringes of different colors used to create a single chew toy item.

3. The colored liquid silicone is inserted in cavities of a mold (step 816). The mold will have the patterning, lettering, or shapes that the manufacturer desires to have placed on the surface of the base. A size of each of the cavities can vary (e.g., to vary widths of the patterning). A depth of each of the cavities can vary (e.g., to vary heights of the patterning). Typically there will be one mold for the front side of the chew toy and another mold for the back side.

In a specific implementation, the colored liquid silicone is squeezed into the cavities of the mold by hand. However, in other implementations, the liquid silicone is inserted into the mold mechanically or using a machine (e.g., computer-controlled injection). Further, the mold is made of any material that has a higher melting temperature than the silicone such as a metal or high-temperature plastic.

4. After the liquid silicone is placed in the mold, the liquid silicone is heated to make it solidify (step 820). The liquid silicone is heated to set the liquid silicone.

5. The solid silicone material is layered into the mold on top of the decoration (step 824). In this step, the solid silicone material can be placed over the solidified liquid silicone.

6. The solid and liquid silicone material are vulcanized together (step 828). Compressing and heating may be done in a single process step. In an implementation, compressing and heating are done simultaneously in a compressing machine. The temperature in the compressing machine may vary as long as the temperature is high enough to vulcanize the solid and liquid silicones together. Or compressing and heating may be performed in separate steps.

In an implementation, in the compressing machine, the solid silicone is heated to a temperature of about 200 degrees Celsius (about 392 degrees Fahrenheit) for about 2 minutes, and the liquid silicone is heated to a temperature of about 160 degrees Celsius (about 320 degrees Fahrenheit) for about 2 minutes.

7. After vulcanization is complete, the finished chew toy is allowed to cool (step 832). In an implementation, cooling is by water cooling and the cooling time is about 15 seconds.

8. Silicone flashing is removed from the chew toy (step 836). The silicone flashing can also be trimmed.

The finished chew toy can be packaged for sale. After step 8, as discussed above, the process can include further steps of using additional molds and liquid silicone layers that are applied on top of the already vulcanized liquid silicone. This is useful for creating perhaps even more intricate patterning on the dog chew product.

Generally, the more intricate the patterning is, the more time it takes to make a chew toy, thus increasing its cost. For example, a chew toy with six stars will generally be more expensive to manufacture than a chew toy with four stars. More time and material is needed to fill the two additional starts in the mold with liquid silicone. Also, any additional liquid silicone, mold, compression, and heating steps after step 7 would also increase the cost.

This silicone rubber manufacturing technique allows for the creation of unique design features such as intricate multicolor and multilevel design detailing, vibrant true colors without the use of paint, and numerous shape and size options.

In an implementation, the base is made of solid silicone (e.g., 100 percent silicone). In other implementations, the base can be hollow or include cavities, grooves, or compartments in which treats can be placed. A chew toy with a treat can make the chew toy more interesting to pets because the odor of the treat attracts a pet to a toy. Then, the pet will continue to gnaw and chew at the chew toy.

Some examples of treats include beef, pork, chicken, turkey, fish, peanut butter, chocolate, cheese, jelly, preserves, honey, nutella, marzipan, Vegemite, fruit, catnip, and others. The treats may be placed there by the chew toy user or the manufacturer can insert a treat into the chew toy during manufacture.

The chew toy can also be used to dispense treats. In an implementation, a silicone material serving as a base material for a chew toy includes a cavity. The cavity can have an opening near a surface of the chew toy or can be an interior or inner cavity.

Figure 9:
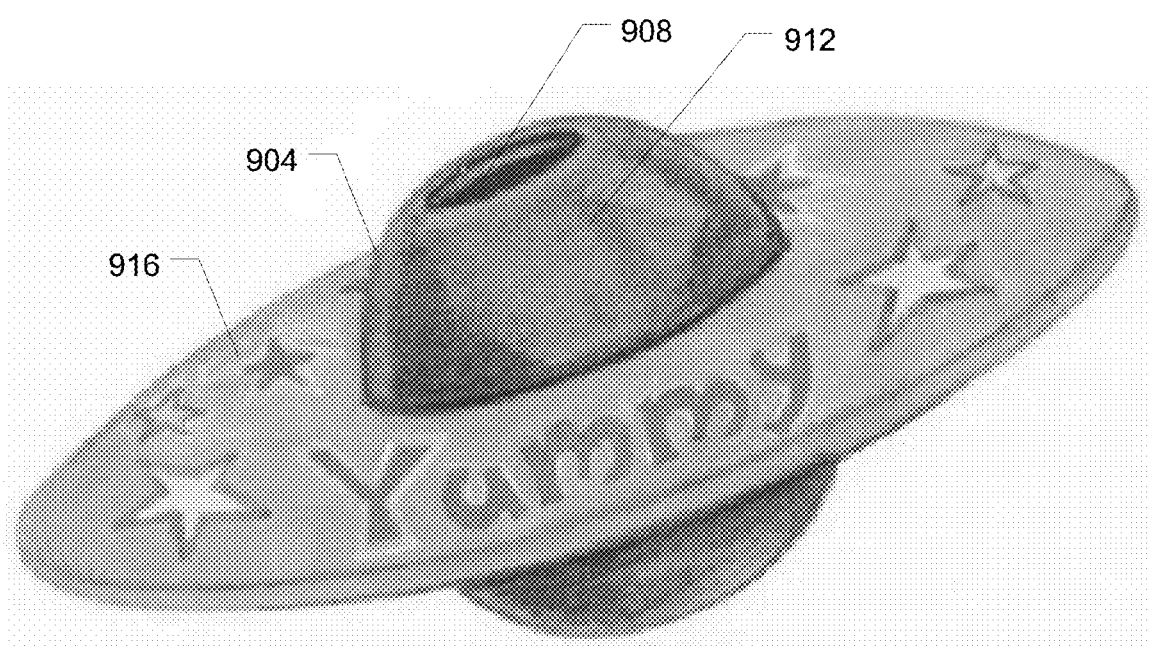
FIG. 9 shows a specific implementation of a treat dispenser toy having a cavity.
Figure 10:
FIG. 10 shows a top view of the treat dispenser toy.
Figure 11:
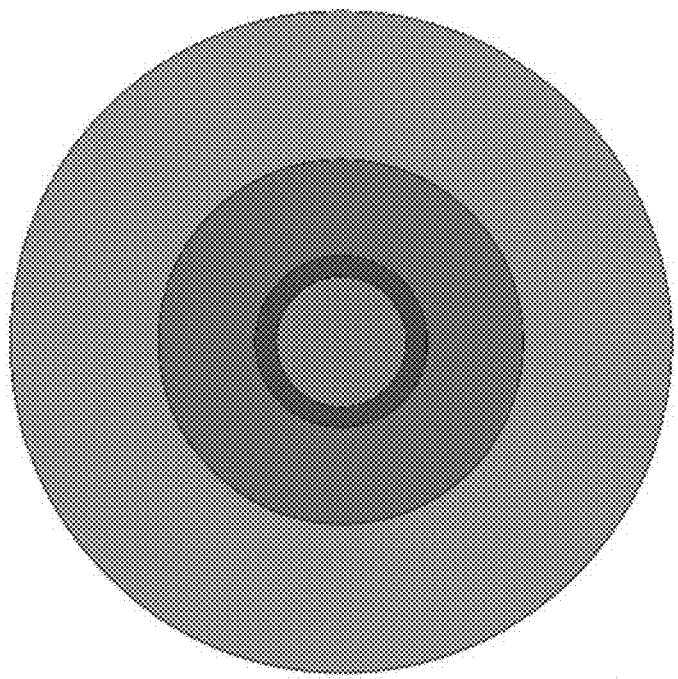
FIG. 11 shows a bottom view of the treat dispenser toy.
Figure 12:
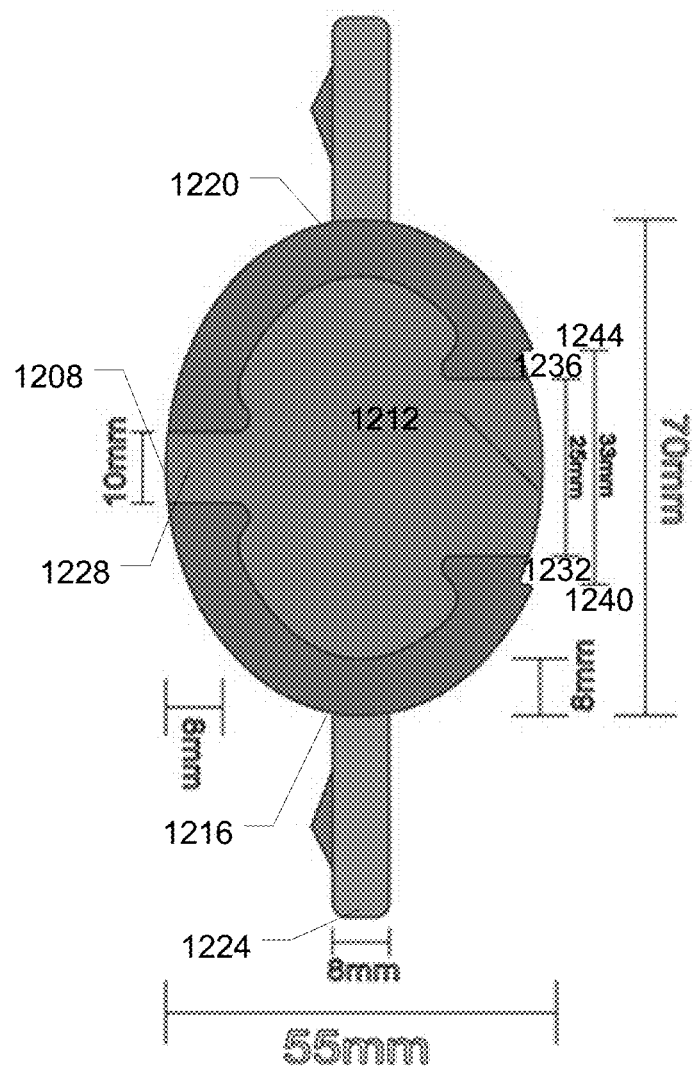
FIG. 12 shows a cross sectional view of the treat dispenser toy.

FIG. 9 shows a specific implementation of a treat dispenser chew toy 904 having a cavity 908. FIG. 10 shows a top view of the treat dispenser toy. FIG. 11 shows a bottom view of the treat dispenser toy. FIG. 12 shows a cross sectional view of the treat dispenser toy.

In FIG. 9, the chew toy has a flying saucer shape that includes a round portion 912 and a saucer portion 916. In an implementation, the round and saucer portions are attached by fusing them together. The portions are attached by melting and liquefying together the silicone of the round and saucer portions. In another implementation, the round and saucer portions are attached by using silicone glue.

The round portion includes the cavity. Dimensions of the chew toy can vary. For example, dimensions of the cavity can vary. A solid treat can be inserted into the cavity. In an implementation, the cavity is small enough so that a user can push a solid treat into the cavity and the treat will not fall out easily. The dog can continue to chew at the chew toy before tasting the treat. Further, a diameter or thickness of the saucer portion can vary. In an implementation, a diameter of the saucer portion is 127 millimeters (see FIG. 10). A distance from a top side of the round portion 1208 to a bottom side of the round portion 1212 is about 55 millimeters. A distance from a left side of the round portion 1216 to a right side of the round portion 1220 is about 70 millimeters. A thickness 1224 of the saucer portion is about 8 millimeters.

A diameter or distance 1228 of a top of the cavity is about 10 millimeters. A distance from a first side 1232 to a second side 1236 is about 25 millimeters. A distance from a third side 1240 to a fourth side 1244 is about 33 millimeters. To prevent the chew toy from being punctured (e.g., by teeth or other sharp objects), the treat dispenser toy has a thickness of at least 8 millimeters from an outer surface of the round portion to the cavity. A thickness of the silicone is at least 8 millimeters. A thickness of the circular portion can vary along the edges. For example, in an implementation, the treat dispensing toy has a thickness of 9 millimeters along a first portion of the treat dispensing toy and a thickness of 12 millimeters along a second portion of the treat dispensing toy.

In an implementation, a cavity of the treat dispensing toy can hold a volume of 59 cubic centimeters.

Figure 22:
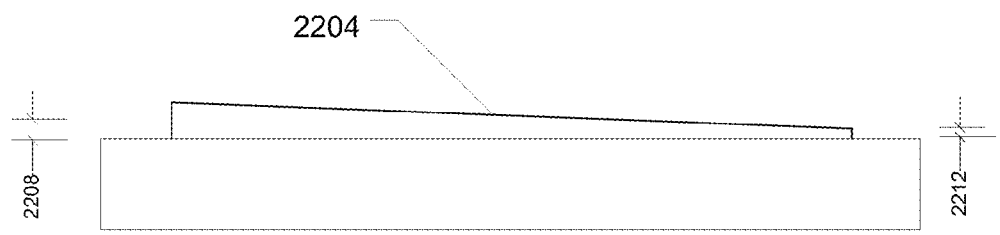
FIG. 22 shows a chew toy including a ridge having a slope less than zero.

A cavity of a chew toy can have different shapes and sizes. For example, FIG. 22 shows another implementation of a cross sectional view of a chew toy 2204 having a round shaped cavity 2208. A treat can be placed in the cavity.

A depth of the cavity can vary according to how deep the manufacturer or user wants the depth of the cavity to be. The greater the depth, the harder it may be for the pet to taste the treat. Further, a size of a cavity can vary based on a size and shape of the chew toy.

Figure 13:
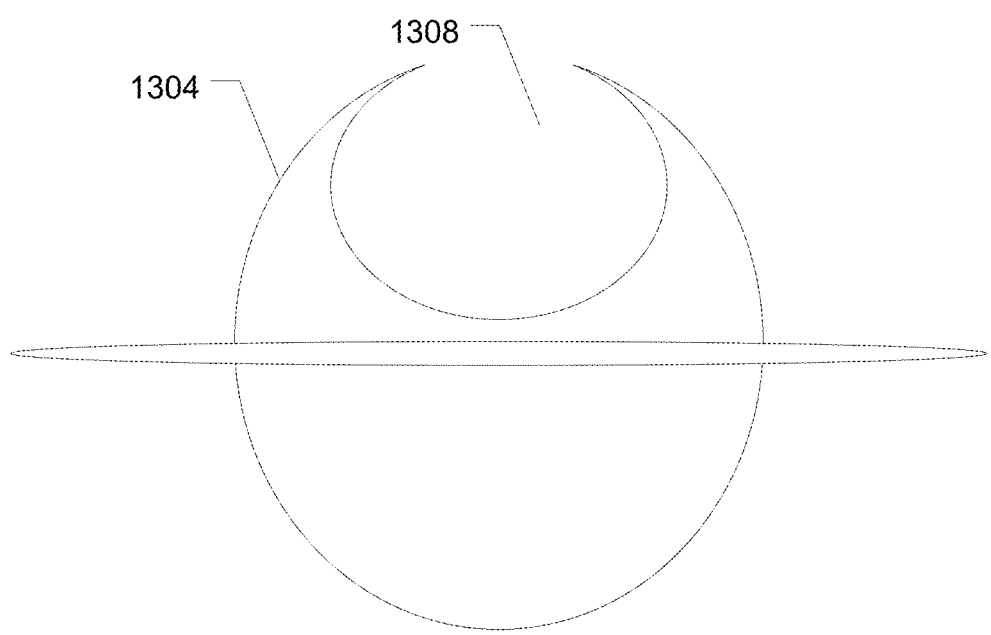
FIG. 13 shows a cross sectional view of a chew toy having a round shaped cavity.

A shape of the cavity can also vary. FIG. 13 shows a cross sectional view of an implementation of the chew toy in FIG. 9. Chew toy 1304 has a cavity 1308 in which a treat can be placed.

Figure 14:
FIG. 14 shows a chew toy.
Figure 15:
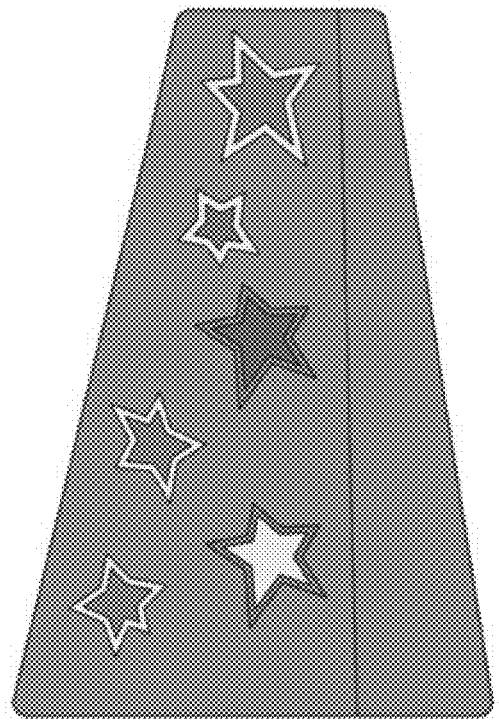
FIG. 15 shows another view of the chew toy.
Figure 16:
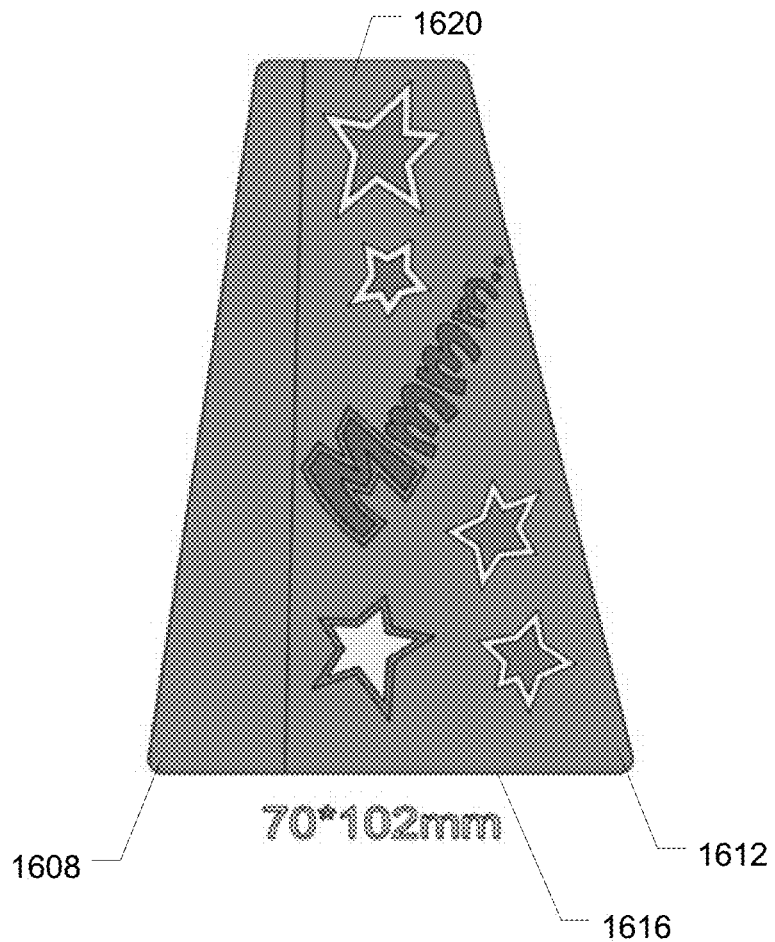
FIG. 16 shows another view of the chew toy.
Figure 17:
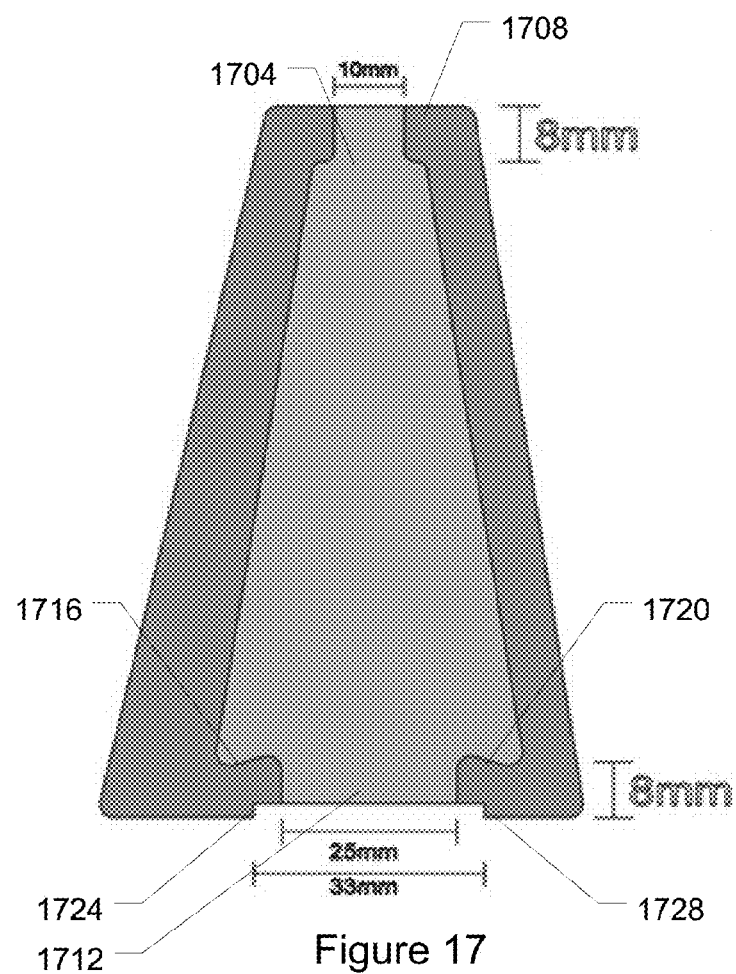
FIG. 17 shows a cross sectional view of the chew toy.
Figure 18:
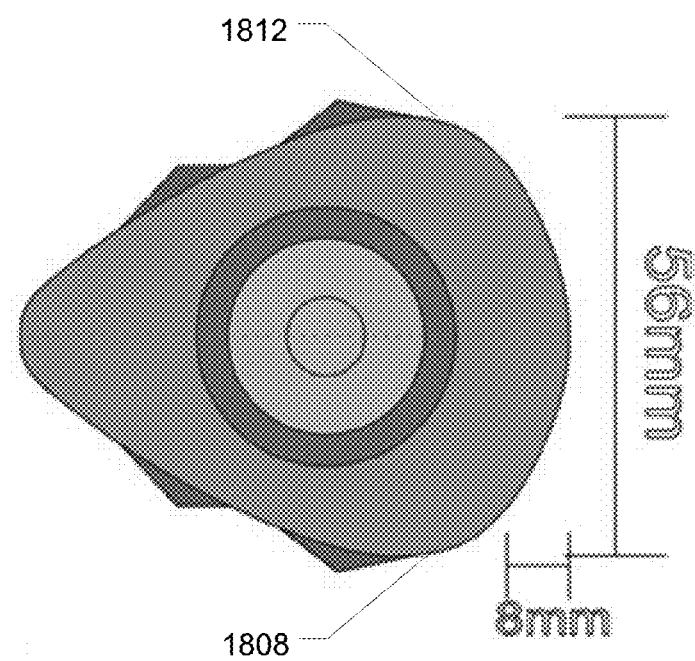
FIG. 18 shows a bottom view of the chew toy.

FIG. 14 shows a chew toy 1404 having a cavity (not shown). FIGS. 15-16 show other views of the chew toy. FIG. 17 shows a cross sectional view of the chew toy. FIG. 18 shows a bottom view of the chew toy.

In FIG. 16, a distance from a first corner 1608 to a second corner 1612 of the chew toy is about 70 millimeters. A distance from a bottom 1616 to a top 1620 of the chew toy is about 102 millimeters. FIG. 17 shows an inner cavity 1704 of the chew toy. The cavity extends from a top side 1708 to a bottom side 1712 of the chew toy. The chew toy has a first ledge 1716 and a second ledge 1720. The ledges secure the treat in the cavity such that the treat does not easily fall out. For example, a user can spread peanut butter on the ledges to more easily keep the peanut butter in the cavity.

In FIG. 17, a diameter of a top side of the cavity is about 10 millimeters. A diameter of a bottom side of the cavity is about 25 millimeters. In this implementation, a diameter of the bottom side of the cavity side of the cavity is larger than a diameter of the top side of the cavity. About 8 millimeters from a top side of the chew toy, a distance from a left side of the cavity to a right side of the cavity increases. About 8 millimeters from a bottom side of the chew toy, a distance from a left side of the cavity to a right side of the cavity increases. These distances can vary and be greater than or less than 8 millimeters. A distance from a left side 1724 to a right side 1728 is about 33 millimeters.

In FIG. 18, a distance from a first side corner 1808 of the chew toy to a second side corner 1812 of the chew toy is about 56 millimeters. A distance from an outer edge of the chew toy to a side of the cavity is about 8 millimeters.

In an implementation, the chew toy has a pyramidal shape and an inner cavity of the pyramidal-shaped chew toy can hold a volume of 43 cubic centimeters. In other implementations, an inner cavity of the chew toy can hold a volume of less than or greater than 43 cubic centimeters.

As discussed above, a cavity of a chew toy can have different shapes and sizes. A size of the cavity can vary depending on what a user desires to put in the cavity or based on the size and shape of the toy.

Figure 19:
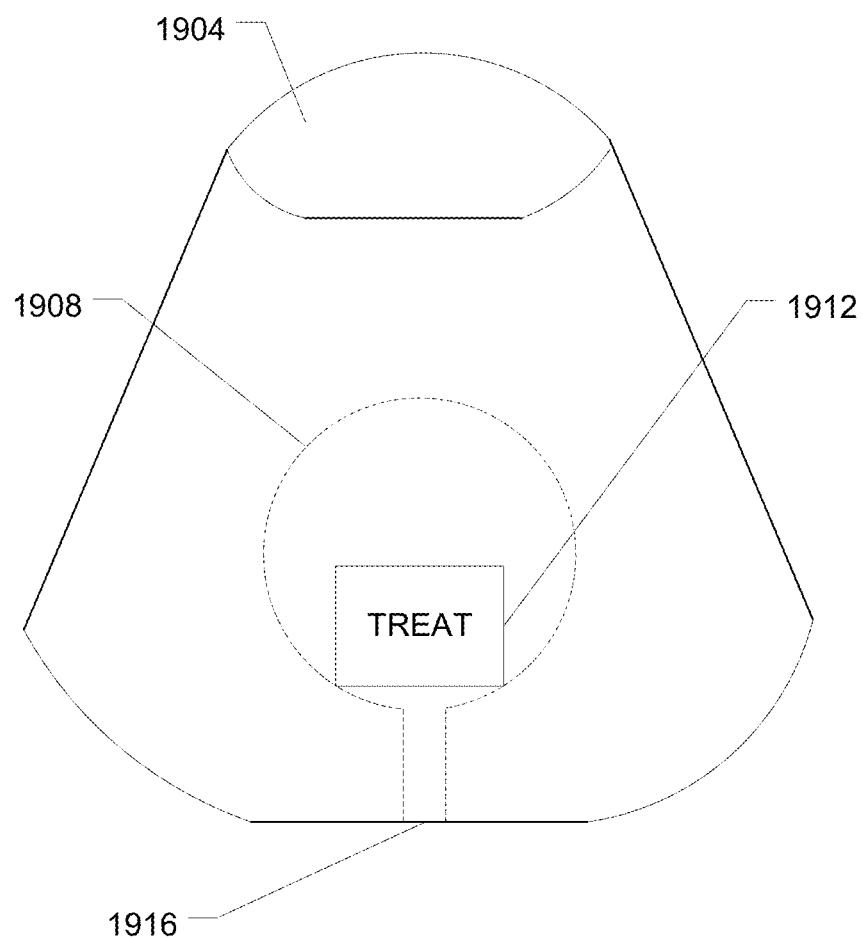
FIG. 19 shows a cross section of the chew toy having a cavity in FIG. 14.

FIG. 19 shows another implementation of a cross section of the chew toy in FIG. 14. A chew toy 1904 includes a cavity 1908. A treat 1912 is inserted into the cavity through an opening 1916. The cavity has a circular or round shape. The opening can be placed at any location of the chew toy. The treat can be a variety of things. For example, in an implementation, the treat is food. In another implementation, the treat is catnip. In another implementation, the treat is an object having an appealing aroma.

Figure 20:
FIG. 20 shows a front view of a specific implementation of a treat dispenser toy having a surface and ridges.
Figure 21:
FIG. 21 shows a side view of a treat dispenser toy and a ridge.

FIG. 20 shows a front view of a specific implementation of a treat dispenser toy 2004 having a surface 2008 and ridges 2012 and 2016. FIG. 21 shows a side view of a treat dispenser toy 2104 and a ridge 2108. In an implementation, the ridges are raised strips and have a height 2112 above the surface. The ridges can be filled with peanut butter or other paste treat. The ridges give a pet a pleasant tactile feel as the pet licks the treat off of the ridges. In an implementation, the ridges are made of silicone material.

In FIG. 21, the ridge has a slope of zero. This is not intended to limit the invention. A slope of a ridge can be greater or less than zero. For example, FIG. 22 shows a chew toy including a ridge 2204 having a slope less than zero. A first side of a ridge has a first height 2208 on a first side and a second side of a ridge has a second height 2212 on a second side. The first height is greater than the second height.

Figure 23:
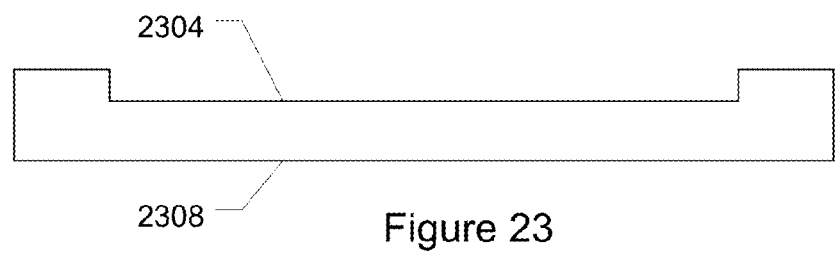
FIG. 23 shows a specific implementation of a treat dispenser toy having ridges that extend toward a side.

The treat dispenser toy can also have ridges that are not elevated above a surface of the treat dispenser toy. FIG. 23 shows another implementation of a treat dispenser toy having ridges that extend toward a side 2308.

Further, in FIG. 20, the ridges have a rectangular shape. This is not intended to limit the invention. The ridges can have any shape. For example, in an implementation, the ridges are triangular-shaped, diamond-shaped, zigzag-shaped, star-shaped, or other. In addition, the ridges can be text, graphics, illustrations, or other.

A length and width of the ridges can vary along a surface of the chew toy. Further, ridges of a chew toy can be different lengths or widths from other ridges of the chew toy. For example, in an implementation, chew toy has a first ridge that is 60 millimeters long and 4 millimeters wide, and a second ridge that is 35 millimeters long and 3 millimeters wide.

Figure 24:
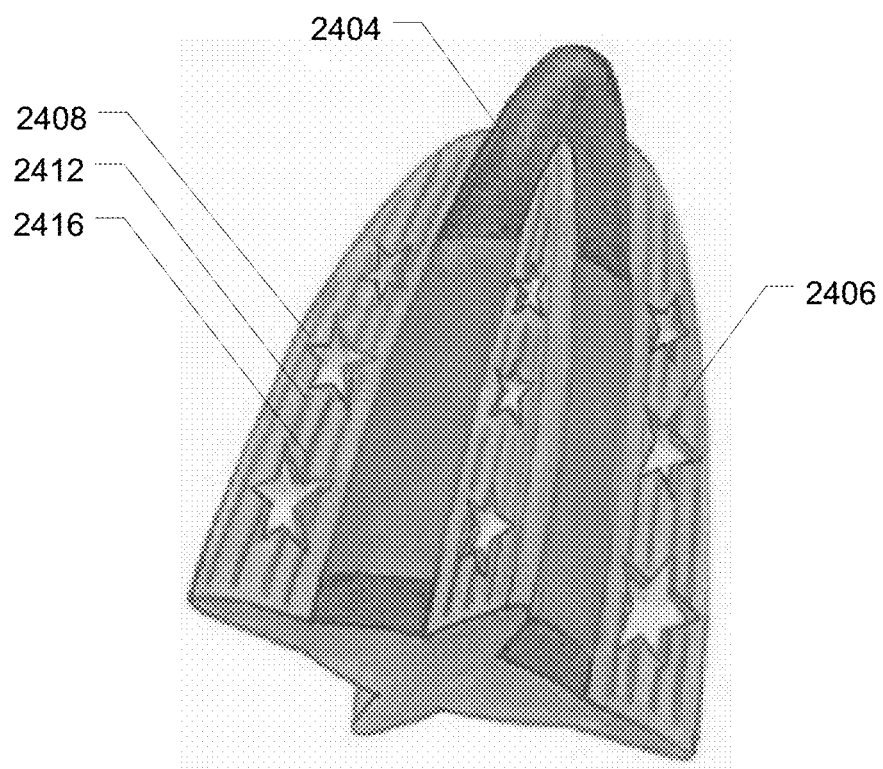
FIG. 24 shows a front view of a dispenser chew toy having a rocket shape with ridges.
Figure 25:
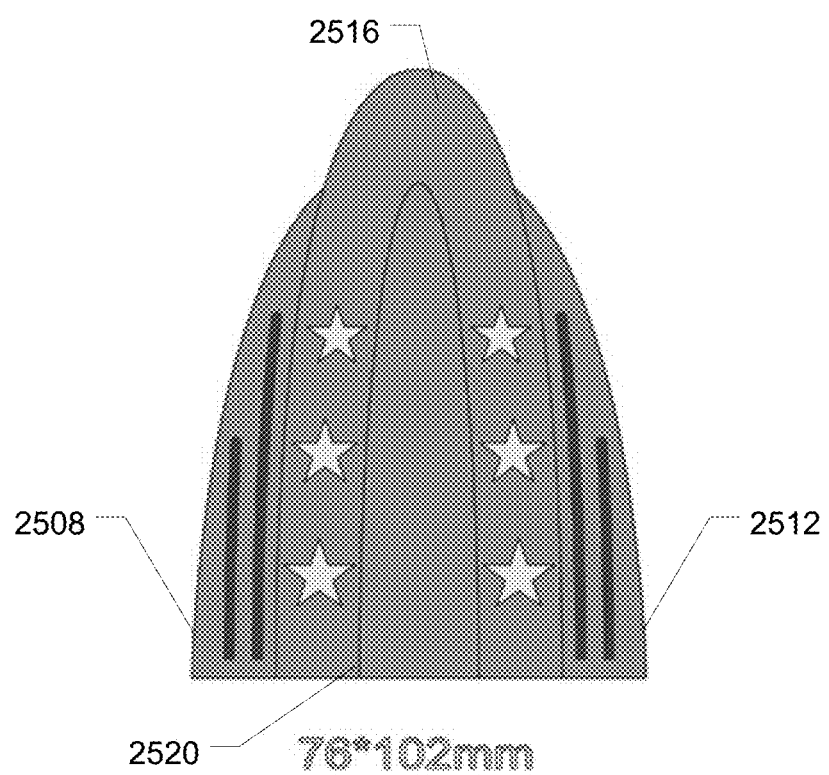
FIG. 25 shows a front view of the rocket dispenser toy.
Figure 26:
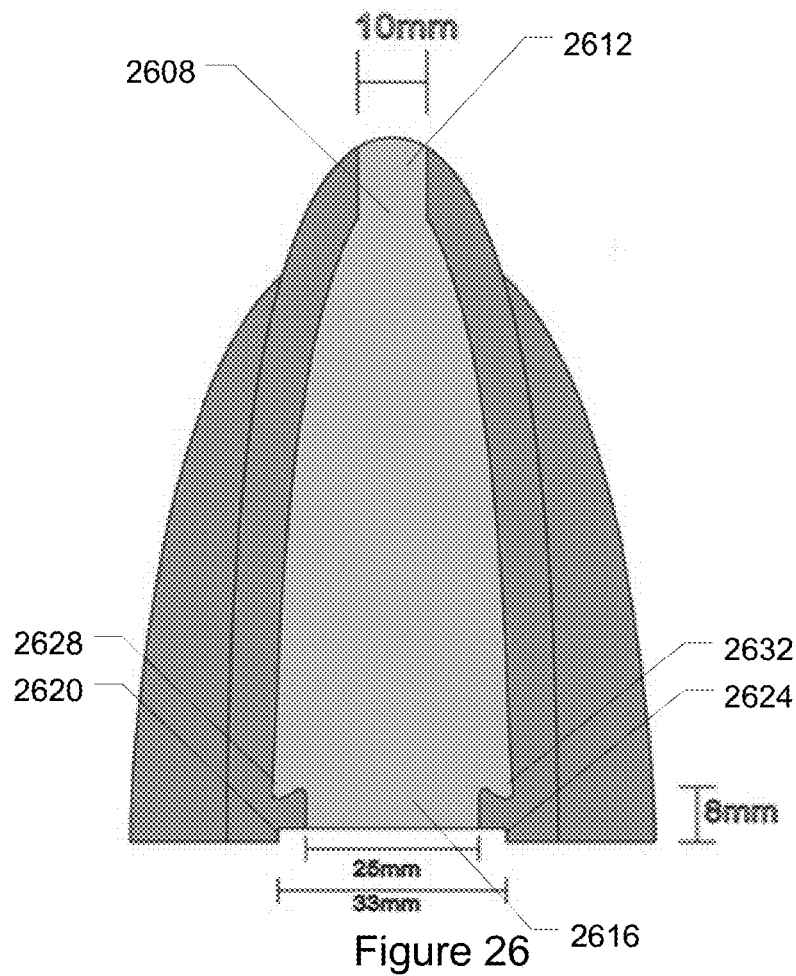
FIG. 26 shows a cross-sectional view of the rocket dispenser toy.
Figure 27:
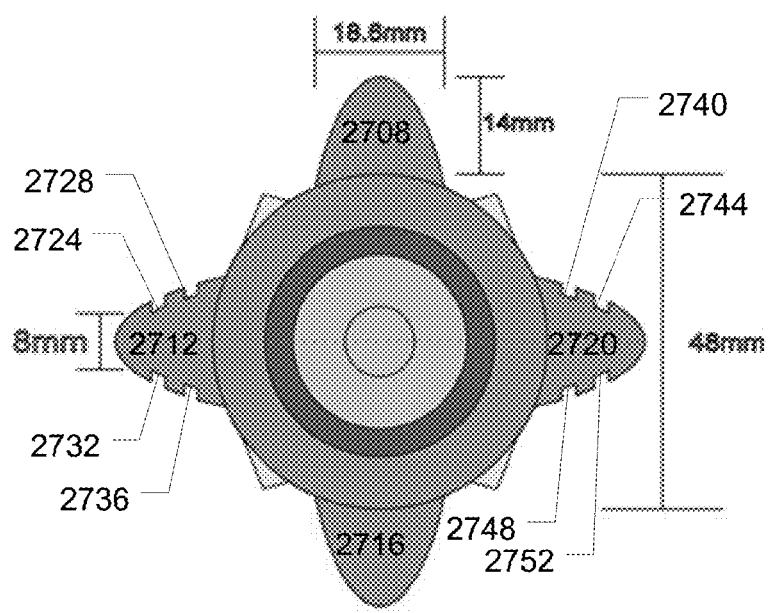
FIG. 27 shows a bottom view of the rocket dispenser toy.

FIG. 24 shows a specific implementation of a treat dispenser toy 2404 having ridges 2408, 2412, and 2416. The dispenser toy has a rocket shape with fins 2406. FIG. 25 shows a front view of the treat dispenser toy. FIG. 26 shows a cross section of the treat dispenser toy. FIG. 27 shows a bottom view of the treat dispenser toy.

In FIG. 25, a distance from a first or left side 2508 to a second or right side 2512 of the treat dispenser toy is about 76 millimeters. A distance from a third or top side 2516 to a fourth or bottom side 2520 of the treat dispenser toy is about 102 millimeters. A height of the treat dispenser toy is about 102 millimeters. These measurements may vary depending on the size and shape of the chew toy.

In FIG. 26, a cavity 2608 extends from a top 2612 to a bottom 2616 of the treat dispenser toy. A distance from a left side to a right side of a top of the cavity is about 10 millimeters. A distance from a left side to a right side of a bottom of the cavity is about 25 millimeters. A distance from a first side 2620 to a second side 2624 of a bottom of the treat dispenser toy is about 33 millimeters. Ledges 2628 and 2632 are located at about 8 millimeters from the bottom side of the treat dispenser toy.

FIG. 27 shows the treat dispenser toy with fins 2708, 2712, 2716, and 2720. Fin 2712 has ridges 2724, 2728, 2732, and 2736. Fin 2720 has ridges 2740, 2744, 2748, and 2752. A width of the ridges can vary.

A diameter of the bottom of the treat dispenser toy is about 48 millimeters. A thickness of fin 2708 is about 18.6 millimeters. A distance from a first side to a second side of fin 2708 is about 14 millimeters. A thickness near a tip of fin 2712 is about 8 millimeters.

In an implementation, a cavity of the rocket can hold a volume of 57 cm$^3$. In other implementations, a cavity of the dispenser toy can hold a volume of less or greater than 57 cm$^3$.

In an implementation, the base material for the chew toy is shaped to have ridges. In this implementation, the solid liquid silicone is shaped to have ridges. In another implementation, the ridges are liquid silicone that is mixed with a colorant and is compressed and heated to vulcanize the base material (e.g., solid) of the chew toy and liquid silicones together.

Figure 28:
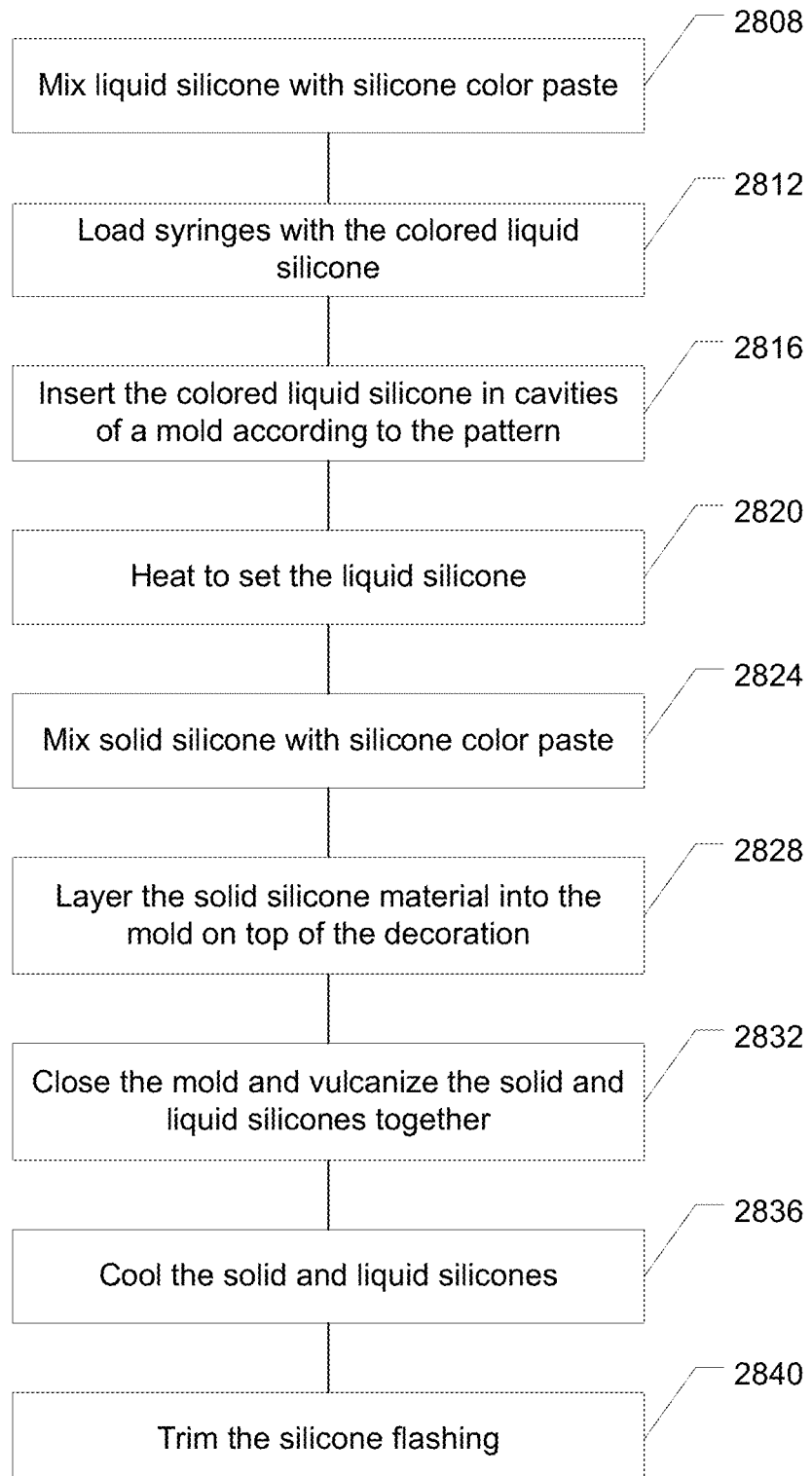
FIG. 28 shows a specific process flow for making a silicone chew toy having a cavity.

FIG. 28 shows a specific process flow for making a silicone chew toy having a cavity:

1. Mix liquid silicone with silicone color paste (step 2808).
2. Load syringes with the colored liquid silicone (step 2812). One color can be loaded into one syringe.
3. Insert the colored liquid silicone in cavities of a mold according to the pattern (step 2816).
4. Heat to set the liquid silicone (step 2820). In an implementation, the liquid silicone is heated for 3-5 minutes according to space.
5. Mix solid silicone with silicone color paste (step 2824).
6. Layer the solid silicone material into the mold on top of the decoration (step 2828).
7. Close the mold and vulcanize the solid and liquid silicone together (step 2832).
8. Cool the solid and liquid silicone (step 2836).
9. Trim the silicone flashing (step 2840).

Figure 29:
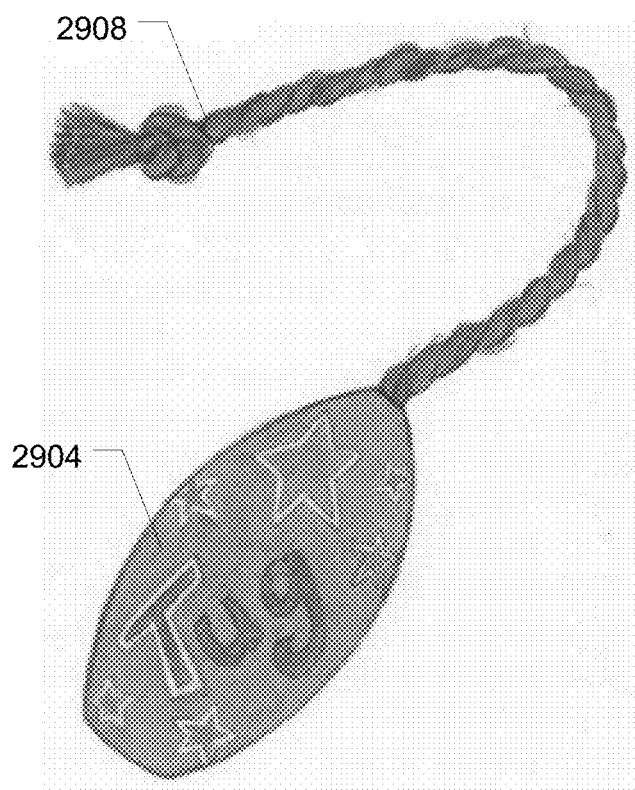
FIG. 29 shows a chew toy having a silicone portion and a rope portion.

In another implementation, the chew toy has a combination of materials. FIG. 29 shows a chew toy having a silicone portion 2904 and a rope portion 2908. The rope is a rope tug portion that a pet can also chew on. The silicone portion is connected or joined to the rope portion through a connecting means. In an implementation, the rope portion is glued to the silicone portion. In another implementation, the silicone portion has an opening at a first end in which the rope portion is slid through. In the figure, the rope portion has a knot at the end. In another implementation, the rope portion does not have a knot at the end. In another implementation, the rope portion has a bow at the end.

Figure 30:
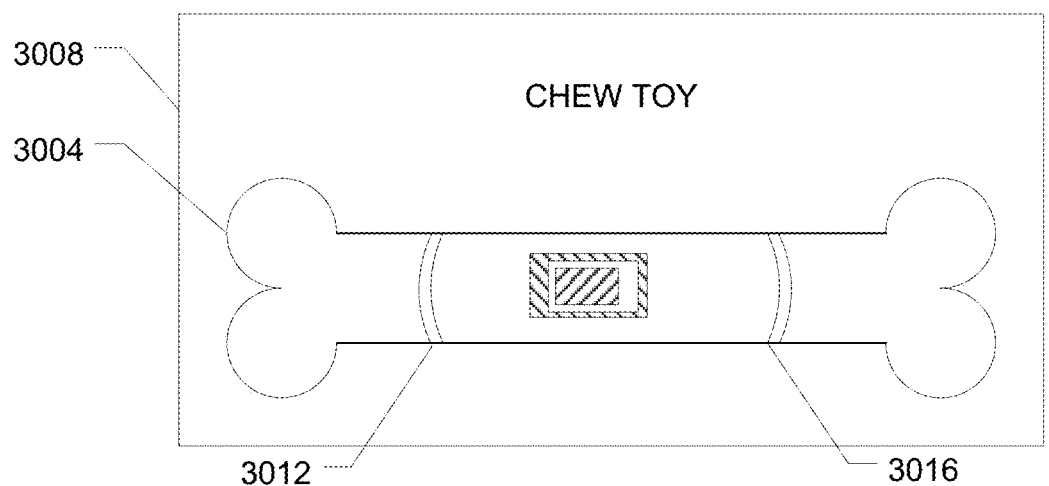
FIG. 30 shows a specific implementation of a chew toy package having a chew toy, a card, and wires.

The toy can be packaged for sale. FIG. 30 shows a specific implementation of a chew toy package having a chew toy 3004, a card 3008, and wires 3012 and 3016. The chew toy is attached or connected to the card via the wires. A potential buyer can feel the silicone chew toy before purchasing the product.

The card has the text "CHEW TOY" on it. This is not intended to limit the invention. In an implementation, the card has graphics, illustrations, photos, other text, or a combination of these. The card can be made of various materials. For example, the card can be made of rigid paper, plastic, cardboard, or other.

In the figure, the package has two wires. This is not intended to limit the invention. The package can have less than two wires or more than two wires. In an implementation, the package has one wire. In another implementation, the package has three wires. The more wires a package contains, the more expensive it may be to package the chew toy because the package uses more material and labor. Further, the wires can be made of various materials. For example, the wires can be made of metal, plastic, or other.

In another implementation, the chew toy enclosed in a box. This helps prevent the silicone chew toy from being touched before it is purchased.

Using 100 percent silicone for the chew toy has numerous benefits. Silicone is more reliable than other organic materials even under extreme conditions. It has tremendous resistance to temperature extremes from about 316 degrees Celsius (about 600 degrees Fahrenheit) to about −101 degrees Celsius (about −150 degrees Fahrenheit), retaining a far higher tensile strength and tear resistance than do many organic rubbers. It substantially resists the deteriorating effects of sunlight, ozone, rain water, and atmospheric gases which cause weathering. Silicone does not cause staining, corrosion, or deterioration like other materials. As a result, the silicone chew toy is durable and can be left outside without fear of being damaged. This prevents designs on the body of the bone from being chewed out or damaged. Furthermore, it is water resistant and flame retardant.

Other advantages of using silicone are that it is odorless and tasteless. This prevents the chew toy from having a bad taste when it is initially used. Further, silicone will not support the growth of fungus, mold, or bacteria. This helps prevent the spread of germs and bacteria, and allows the silicone to be put in a person's or animal's mouth. A chew toy made of silicone will be tough but gentle on the gums.

As discussed above, in an implementation, the silicone used is a food grade silicone. Food grade silicone is nontoxic, does not stain food, dishes, or cookware, and is safe for use with foods that are to be consumed by pets, humans, and animals. Food grade silicone can be used in chew toys with compartments and cavities that will hold treats and food for pets. The liquid and solid silicone of the chew toy are both made of food grade silicone. The pets will be able to chew the toy and eat the food without ingesting any harmful chemicals or toxic substances.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A silicone chew toy comprising:
a base layer, made from a solid silicone material of a first color, comprising a first side and a second side, a thickness of at least 16 millimeters between the first and second sides, a minimum width of at least 38 millimeters, and a minimum length is at least the same as the minimum width; and
a first layer, made from a liquid silicone material of a second color, formed and vulcanized on the first side of the base layer, the first layer having a thickness of at least 0.5 millimeters,
wherein the first color is different from the second color, and
the silicone chew toy comprising the base and first layers can withstand at least 100 pounds of bite pressure for at least 10 seconds without breakage.

2. The silicone chew toy of claim 1 comprising:
a second layer, made from a liquid silicone material of a third color, formed and vulcanized on the first side of the base layer, the first layer having a thickness of at least 0.5 millimeters,
wherein a pattern of the second layer on the first side encloses a pattern of the first layer on the first side, and the third color is different from the first and second colors.

3. The silicone chew toy of claim 2 wherein the first layer has a greater thickness than the second layer.

4. The silicone chew toy of claim 2 comprising:
a gap, between the pattern of the first layer and the pattern of the second layer, in which the base layer is visible between the patterns of the first and second layers.

5. The silicone chew toy of claim 1 wherein the length of the base layer is at least about 135 millimeters, a maximum width of the base layer is at least about 65 millimeters, and
the base layer has a first end portion joined to a middle portion, which is joined to a second end portion,
the middle portion has a width of at least the minimum width and less than the maximum width, and
the first end and the second ends have a width of the maximum width.

6. The silicone chew toy of claim 1 wherein the base layer is solid silicone comprising a silicone colorant of the first color and the first layer is made from liquid silicone comprising a silicone colorant of the second color.

7. The silicone chew toy of claim 1 comprising:
an opening in the base layer; and
an interior cavity in the base layer, the interior cavity being joined to the opening, wherein through the opening an edible substance can be stored in the interior cavity.

8. The silicone chew toy of claim 7 wherein the opening and interior cavity extend in a line across a surface of the base layer.

9. The silicone chew toy of claim 1 comprising:
a hole extending from the first side to the second side of the base layer;
a rope, looped through the hole in the base layer.

10. The silicone chew toy of claim 1 comprising:
a second layer, made from a liquid silicone material of a third color, formed and vulcanized on the first side of the base layer, the second layer having a thickness of at least 0.5 millimeters, wherein the third color is different from the first and second colors.

11. A silicone chew toy comprising:
a base layer, made from a solid silicone material of a first color, comprising a first side and a second side, a thickness of at least 8 millimeters between the first and second sides, a minimum width of at least 38 millimeters, and a minimum length is at least the same as the minimum width; and
a first layer, made from a liquid silicone material of a second color, formed and vulcanized on the first side of the base layer, the first layer having a thickness of at least 0.5 millimeters, wherein the first color is different from the second color, and the silicone chew toy comprising the base and first layers can withstand at least 100 pounds of bite pressure for at least 10 seconds without breakage.

12. The silicone chew toy of claim 11 comprising:

a second layer, made from a liquid silicone material of a third color, formed and vulcanized on the first side of the base layer, the second layer having a thickness of at least 0.5 millimeters, wherein the third color is different from the first and second colors.

13. The silicone chew toy of claim 12 wherein the first layer has a greater thickness than the second layer.

14. The silicone chew toy of claim 12 comprising:

a gap, between a pattern of the first layer and a pattern of the second layer.

15. The silicone chew toy of claim 14 wherein the base layer is visible through the gap between the patterns of the first and second layers.

16. The silicone chew toy of claim 11 comprising:

a hole extending from the first side to the second side of the base layer;

a rope, looped through the hole in the base layer.

17. The silicone chew toy of claim 11 comprising:

an opening in the base layer; and an interior cavity in the base layer, the interior cavity being joined to the opening, wherein through the opening an edible substance can be stored in the interior cavity.

18. The silicone chew toy of claim 17 wherein the opening and interior cavity extend in a line across a surface of the base layer.

19. A silicone chew toy comprising:

a base layer, made from a solid silicone material of a first color, comprising a first side and a second side, a thickness of at least 8 millimeters between the first and second sides, a minimum width of at least 38 millimeters, and a minimum length is at least the same as the minimum width; and a first layer, made from a liquid silicone material of a second color, formed and vulcanized on the first side of the base layer, the first layer having a thickness of at least 0.5 millimeters, wherein the first color is different from the second color; and a second layer, made from a liquid silicone material of a third color, formed and vulcanized on the first side of the base layer, the second layer having a thickness of at least 0.5 millimeters, wherein the third color is different from the first and second colors; and a gap, between a pattern of the first layer and a pattern of the second layer, wherein the silicone chew toy comprising the base and first layers can withstand at least 100 pounds of bite pressure for at least 10 seconds without breakage.

20. The silicone chew toy of claim 19 wherein the base layer is visible through the gap between the patterns of the first and second layers.

21. The silicone chew toy of claim 19 comprising:

an opening in the base layer; and an interior cavity in the base layer, the interior cavity being joined to the opening, wherein through the opening an edible substance can be stored in the interior cavity.

22. The silicone chew toy of claim 19 comprising:

a hole extending from the first side to the second side of the base layer;

a rope, looped through the hole in the base layer.

23. The silicone chew toy of claim 19 wherein the first layer has a greater thickness than the second layer.

* * * * *